Nov. 21, 1967          W. B. TEMPLETON          3,353,649
ACCOUNTING MACHINE RECORD HANDLING APPARATUS
Filed Dec. 28, 1964          27 Sheets-Sheet 1
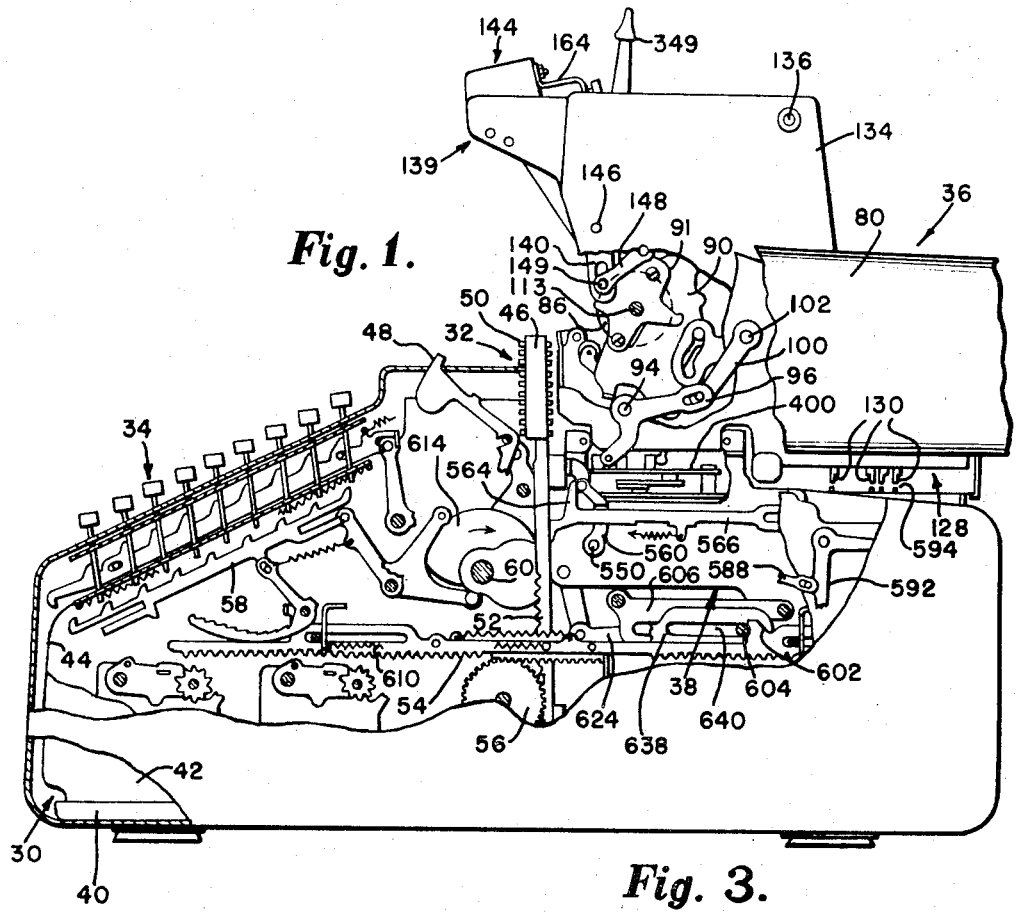
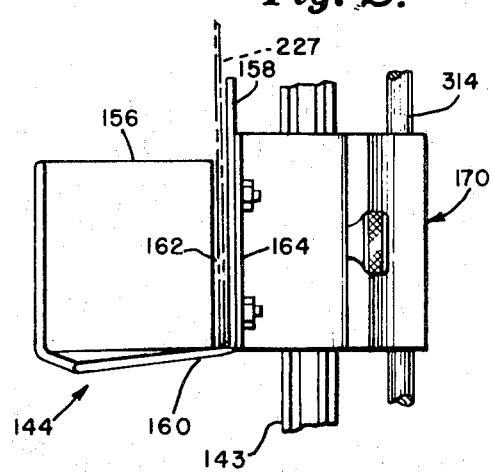
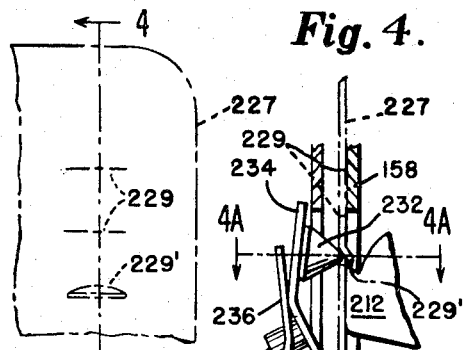
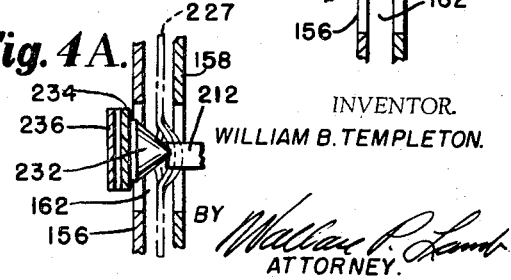
INVENTOR.
WILLIAM B. TEMPLETON.
BY
ATTORNEY.

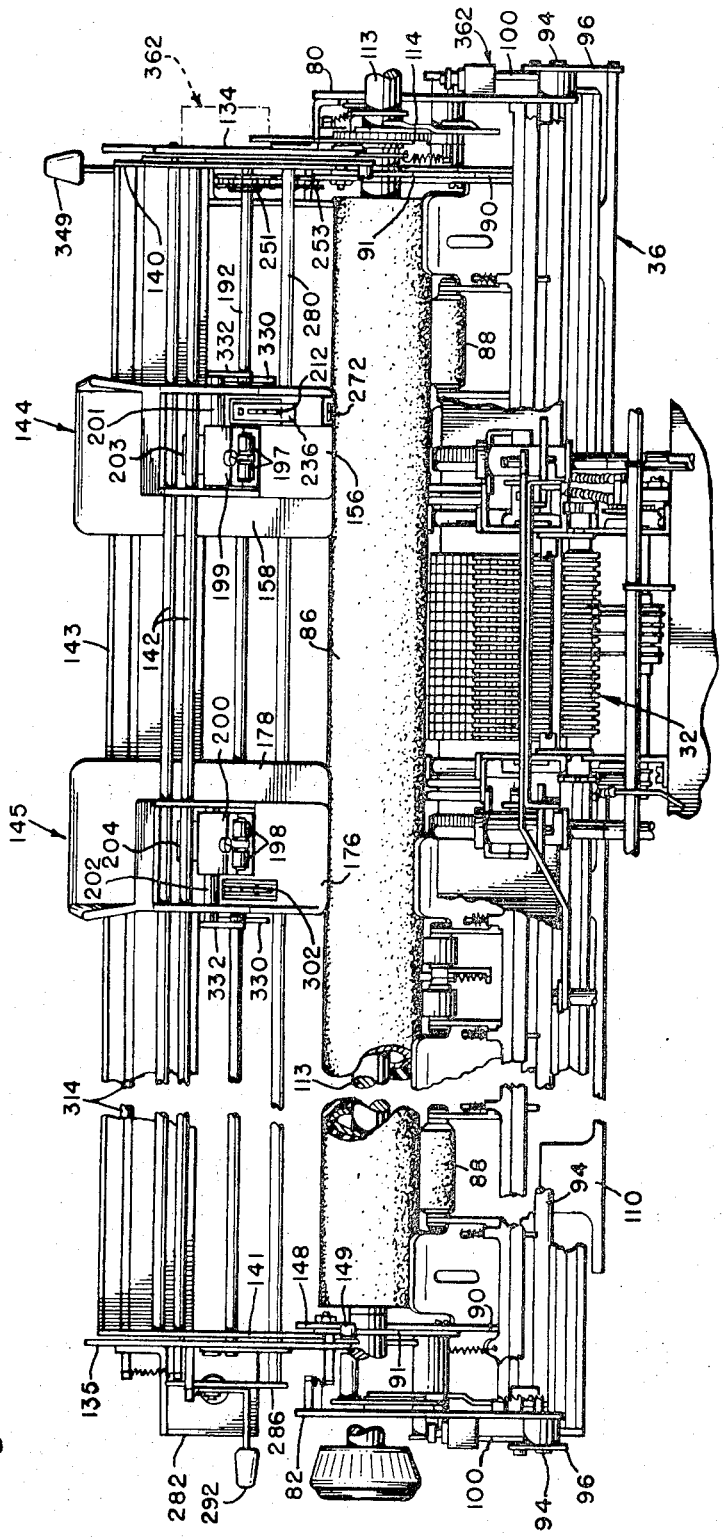

Nov. 21, 1967   W. B. TEMPLETON   3,353,649
ACCOUNTING MACHINE RECORD HANDLING APPARATUS
Filed Dec. 28, 1964   27 Sheets-Sheet 12

BY

Nov. 21, 1967 W. B. TEMPLETON 3,353,649
ACCOUNTING MACHINE RECORD HANDLING APPARATUS
Filed Dec. 28, 1964 27 Sheets-Sheet 13

Nov. 21, 1967  W. B. TEMPLETON  3,353,649
ACCOUNTING MACHINE RECORD HANDLING APPARATUS
Filed Dec. 28, 1964  27 Sheets-Sheet 14

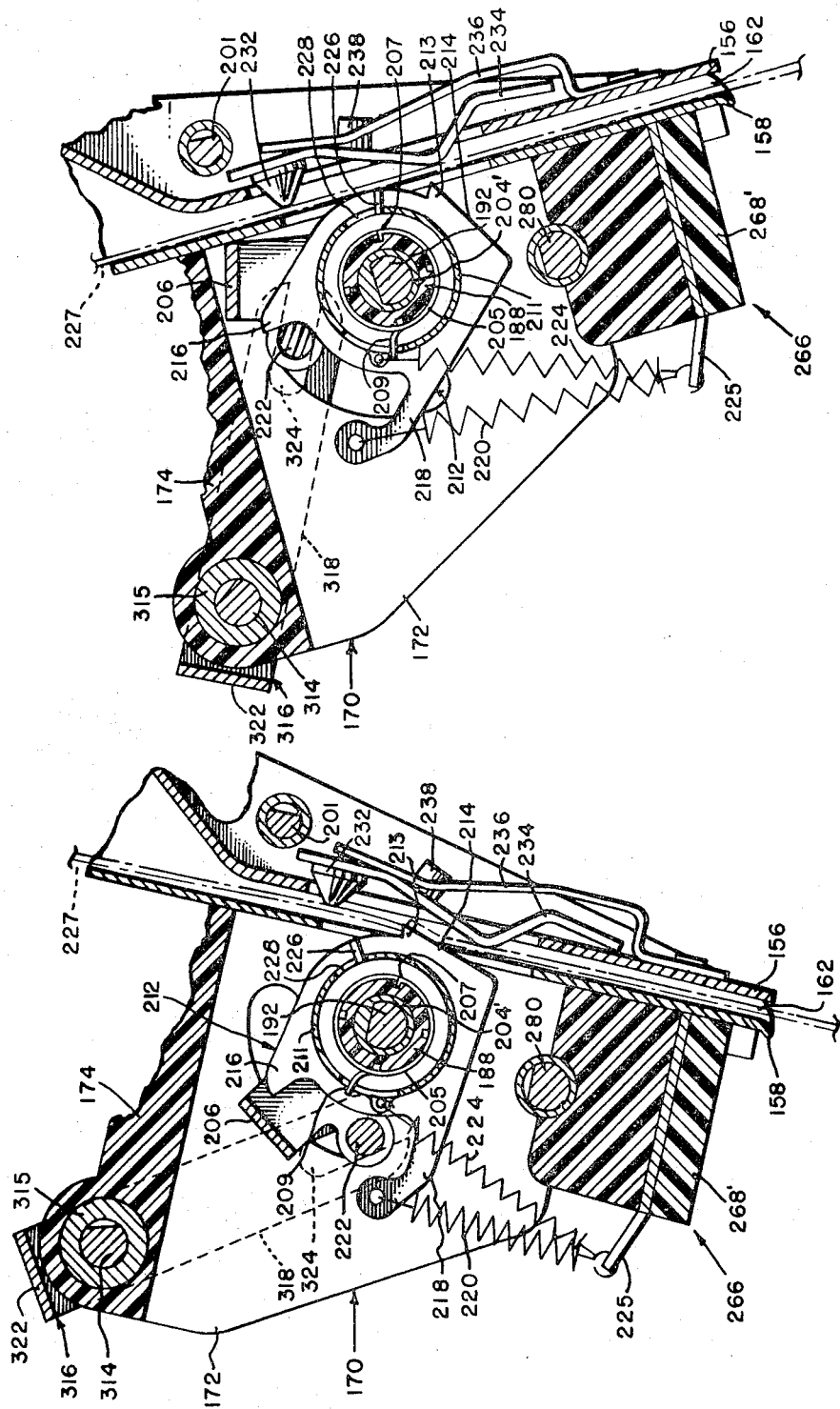

Nov. 21, 1967  W. B. TEMPLETON  3,353,649
ACCOUNTING MACHINE RECORD HANDLING APPARATUS
Filed Dec. 28, 1964  27 Sheets-Sheet 17

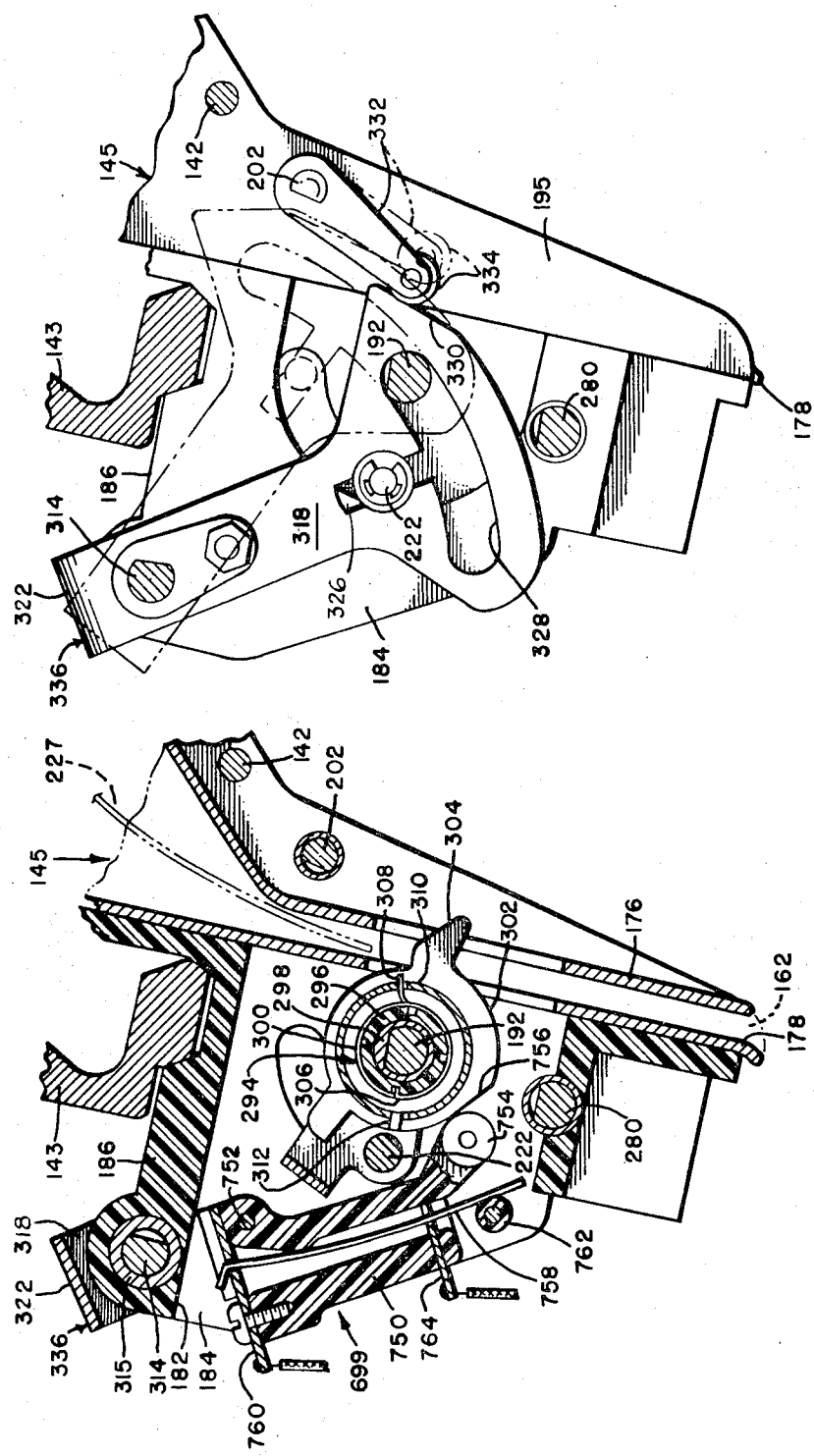

Nov. 21, 1967  W. B. TEMPLETON  3,353,649
ACCOUNTING MACHINE RECORD HANDLING APPARATUS
Filed Dec. 28, 1964

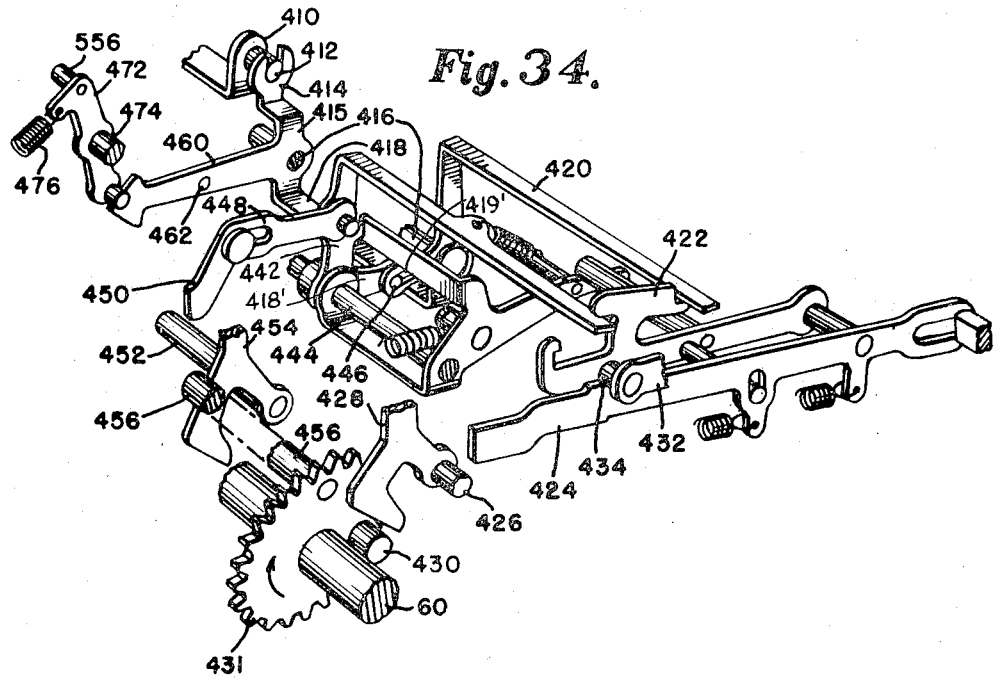
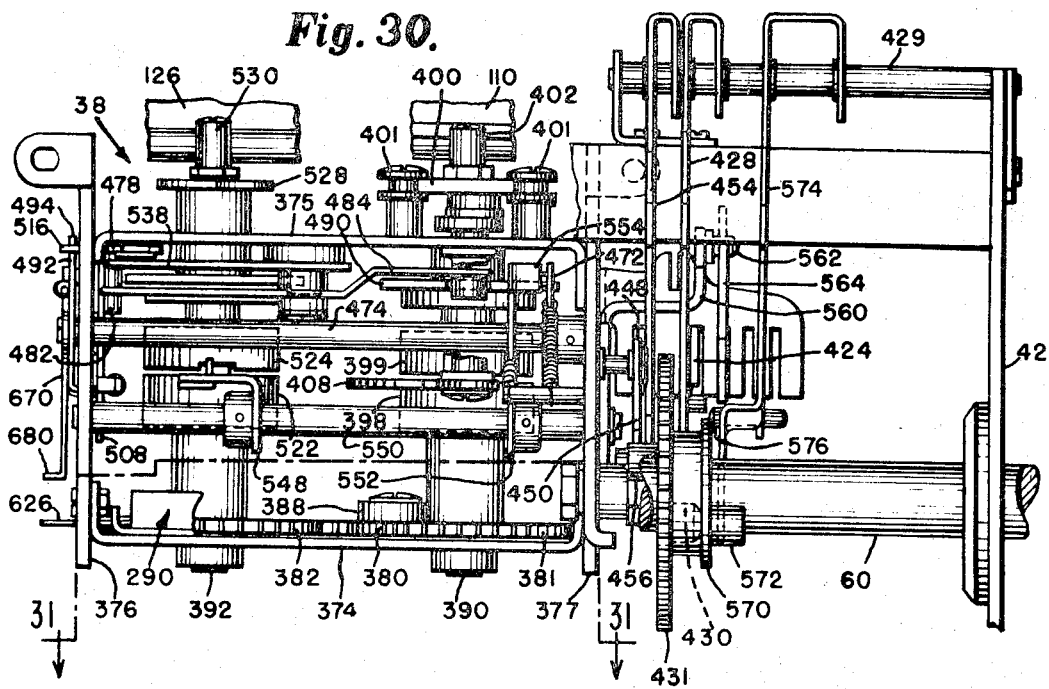

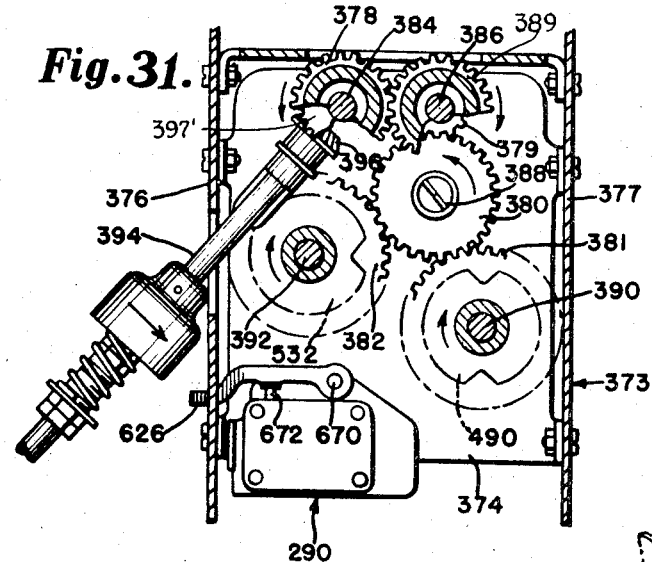
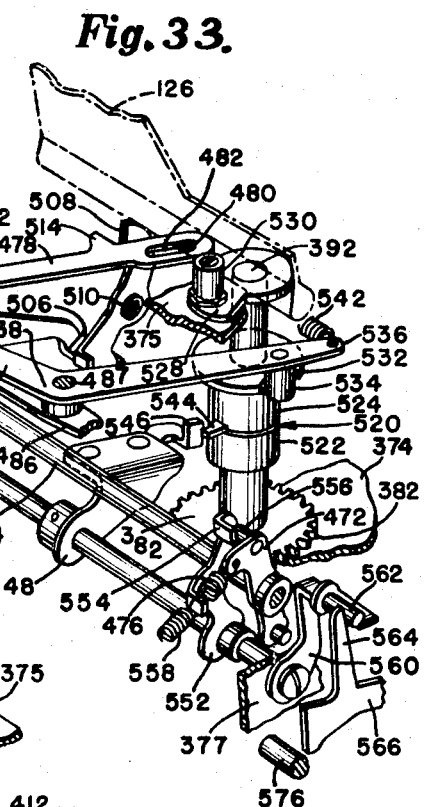
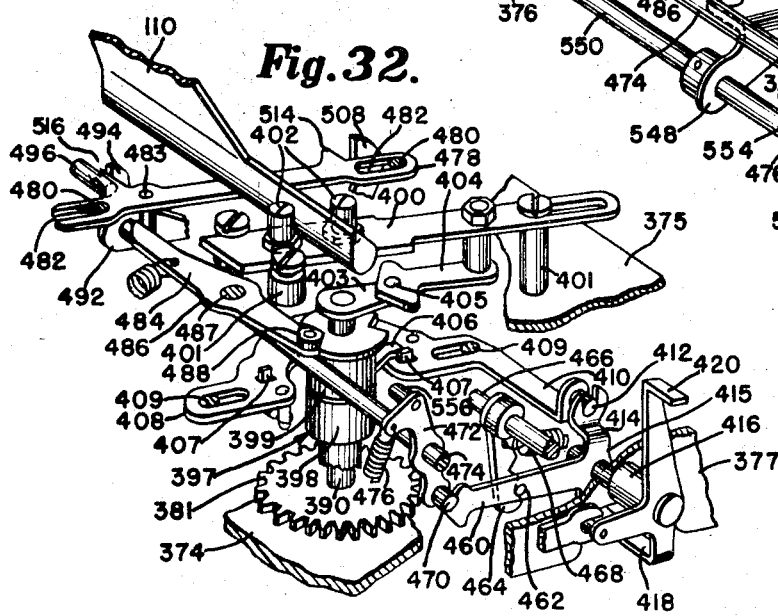

Nov. 21, 1967   W. B. TEMPLETON   3,353,649
ACCOUNTING MACHINE RECORD HANDLING APPARATUS
Filed Dec. 28, 1964   27 Sheets-Sheet 22

United States Patent Office 3,353,649
Patented Nov. 21, 1967

3,353,649
ACCOUNTING MACHINE RECORD
HANDLING APPARATUS
William B. Templeton, Northville, Mich., assignor to Burroughs Corporation, Detroit, Mich., a corporation of Michigan
Filed Dec. 28, 1964, Ser. No. 421,434
2 Claims. (Cl. 197—127)

This invention relates generally to accounting machine record sheet handling apparatus and particularly to mechanism for transferring a record sheet from a sheet feed device to a rotatable platen in sheet handling apparatus involving automatic line find mechanism.

It is the principal object of the invention to provide an improved record sheet handling apparatus for business or accounting machines having sheet feed mechanism for feeding a record sheet to a printing apparatus platen of the type which is normally open and movable to a closed position engaging the sheet.

Another object of the invention is to provide for a printing apparatus of the above mentioned character, an improved record sheet handling apparatus for transferring control of the record sheet to the platen.

Another object of the invention is to provide in a record sheet handling apparatus including a sheet feed mechanism and a line find mechanism in which an operator or sensor engages a mark on the sheet, designating the location of the next available unused line thereon, and stops the feed means, and improved mechanism for transferring control of the sheet from the feed means to the platen in response to the closing action of the platen without sheet obstruction by the line find sensor.

In connection with the next preceding object, it is a specific object of the invention to provide for accounting machine in which a printing apparatus platen closes and pulls a record sheet down from a line find stop position to print position, an improved mechanism responsive to the closing action of the platen to separate sheet feed rollers and at the same time retract the sensor out of the way of the further movement of the sheet by the platen.

Another object of the invention resides in the mounting of the feed mechanism, brake mechanism, line find mechanism and the mechanism for transferring control of a sheet to the printing apparatus platen on horizontally adjustable sheet guideway members.

A further object of the invention is to provide an improved line find sheet stopping device in which a sheet brake is activated by a sheet mark responsive arm which is operatively connected to a coil spring sheet brake in a manner to effect a normal ineffective retracted position, an effective mark sensing position, and a second sheet unobstructing retracted position.

Other objects of the invention will become apparent from the following detail description taken in connection with the accompanying drawings in which:

FIG. 1 is a side view partly broken away and in section of a cyclically operable accounting machine and associated apparatus, embodying features of the invention;

FIG. 2 is a fragmentary plan view of a detail of the machine;

FIGS. 3, 4 and 4A are fragmentary views of a record or ledger sheet;

FIG. 5 is a fragmentary front view of the accounting machine;

FIG. 22 is an enlarged fragmentary view in section similar to FIG. 21 and taken along the line 22—22 of FIG. 21, with the operating parts in their normal or home positions;

FIGS. 23 to 25 are vertical sectional views, similar to FIG. 22, showing the operating parts in progressively different positions as a record sheet is fed into the machine;

FIG. 27 is a vertical sectional view, taken along the line 27—27 of FIG. 7;

FIG. 28 is a vertical sectional view, taken along the line 28—28 of FIG. 7;

FIG. 30 is a front view of the transmission mechanism of FIG. 29;

FIG. 31 is a horizontal sectional view of the transmission mechanism, taken substantially along the line 31—31 of FIG. 30;

FIG. 32 is a perspective view of certain parts of the transmission mechanism;

FIG. 33 is a perspective view of certain other parts of the transmission mechanism with the parts shown removed therefrom;

FIG. 34 is another perspective view of certain parts of the transmission mechanism;

FIG. 39A is a fragmentary view of a detail;

Figure 6:
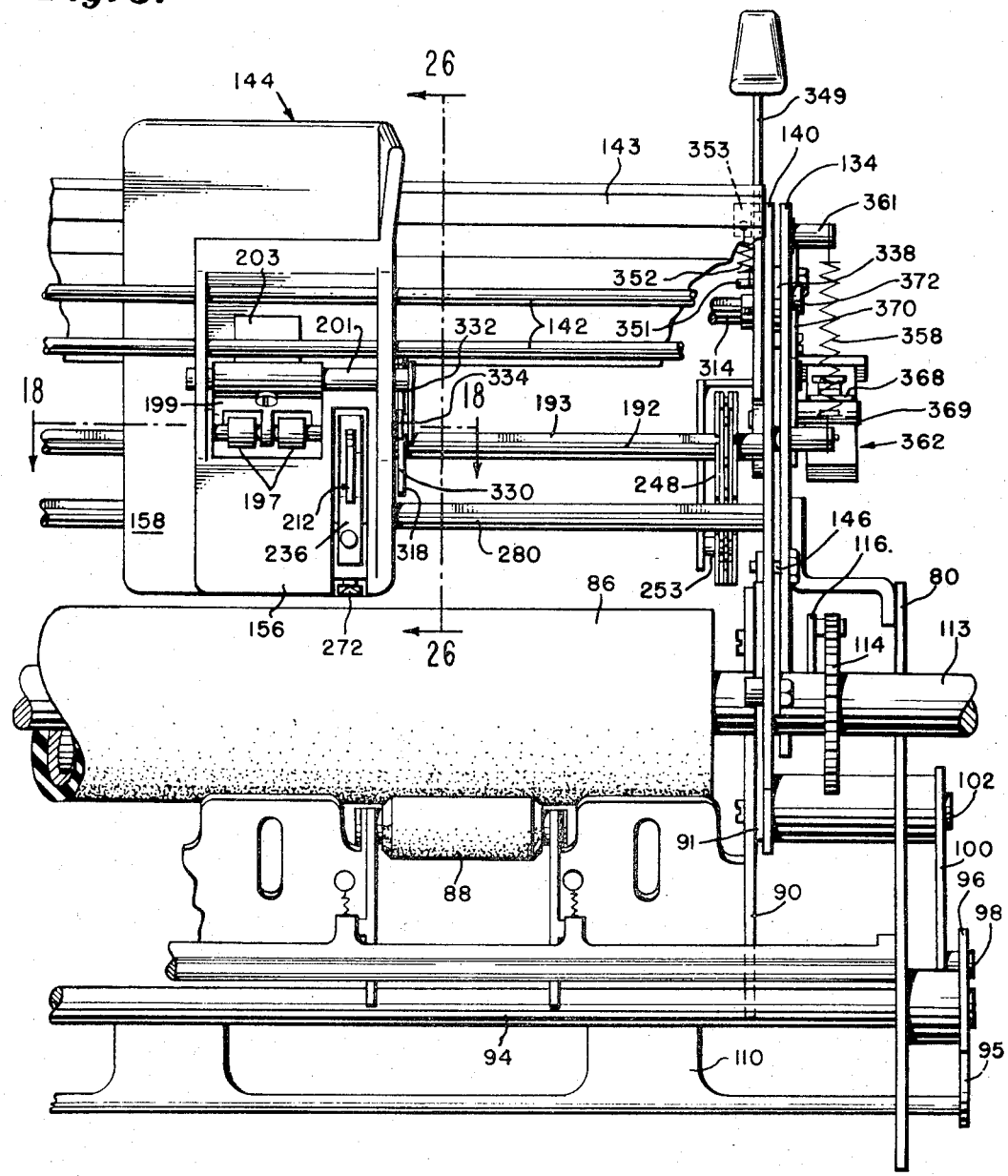
FIG. 6 is an enlarged fragmentary front view of a rightward end portion of the accounting machine.

In the drawings, the invention is illustrated in connection with a cyclically operable accounting machine, such as the machine of the patent to Thomas M. Butler entitled Automatic Function Control Mechanism for Accounting Machines, No. 2,629,549, issued Feb. 24, 1953. As the invention, which is the subject matter of the present application, pertains only to certain ones of the machine mechanisms, the machine has not been herein shown and described in its entirety, but for a complete understanding of the machine, reference may be had to the above mentioned Butler patent.

Referring to the drawings by characters of reference, the accounting machine comprises, in general, a supporting member or frame structure 30, a printing mechanism 32, a keyboard 34, a paper carriage 36 and a power transmission mechanism 38. The printing mechanism 32, keyboard 34, carriage 36 and transmission 38 are mounted on the frame 30 in the usual well known arrangement; the printing mechanism 32 being located horizontally between the keyboard 34 and the carriage 36, and the transmission 38 being located directly below the carriage. The frame structure 30 is preferably mounted on a base 40 and comprises a pair of laterally spaced apart side plates 42 and 44 which are rigidly connected together by the well known cross rods.

The printing mechanism 32, FIG. 1, comprises, in general, a plurality of laterally spaced apart print heads 46, of which there is one for each denomination or columnar row of amount keys on the keyboard 34, and a like number of print hammers 48. Print elements 50 are mounted on each of the print heads 46, and the heads are affixed to the upper ends respectively of a like number of vertical bars 52 which are individually vertically movable to position key selected ones of the print elements 50, at a datum or print line. Horizontally movable amount racks 54, of which only one is shown, are individually connected to the print head bars 52 by gears 56 to raise and lower the print heads 46, the amount racks being differentially positionable in accordance with the setting of stop members 58 by the key indexing of amounts on the keyboard 34.

Figure 29:
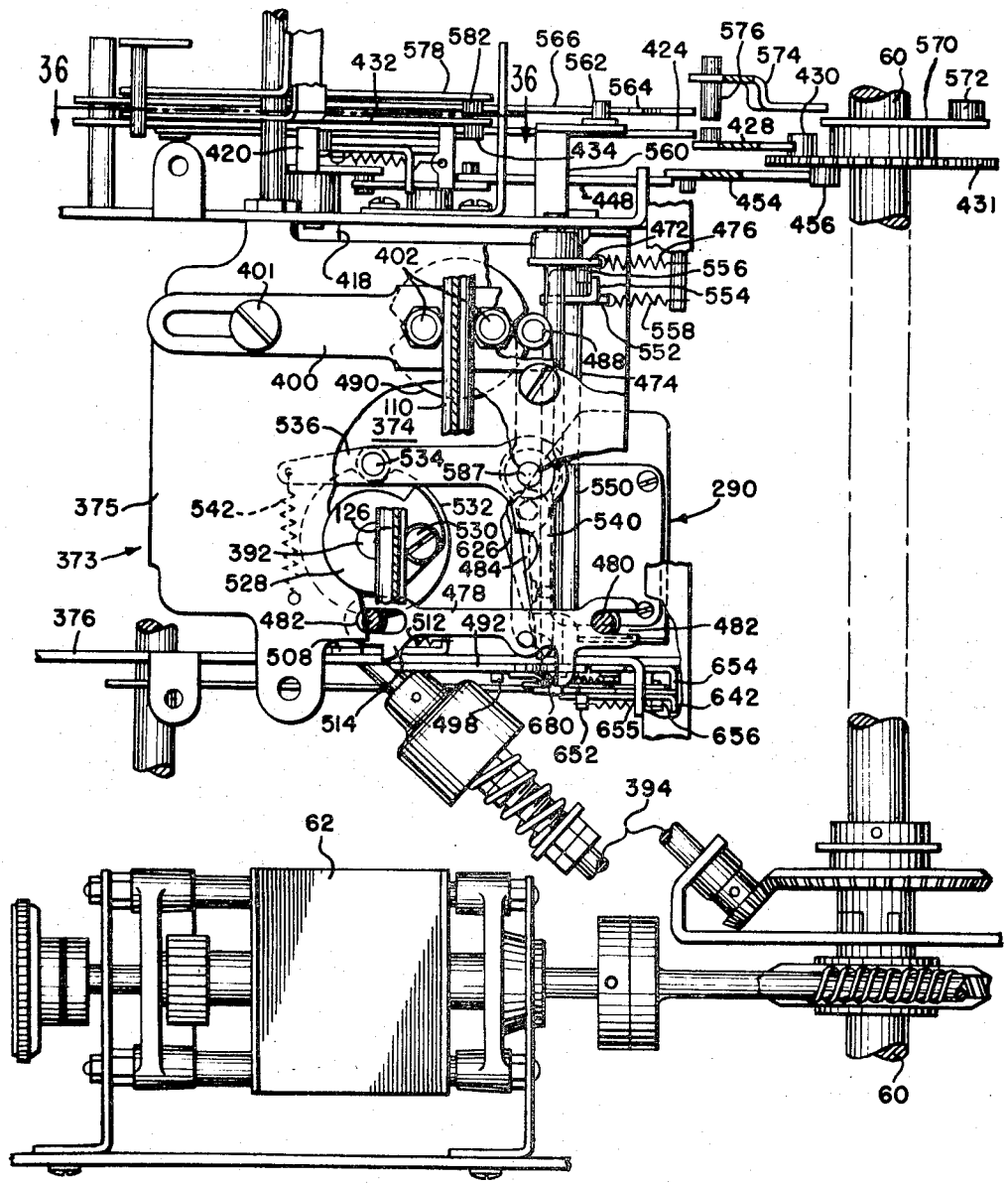
FIG. 29 is a plan view of a power transmission mechanism of the machine and operating and control mechanisms therefor.

Extending between and journaled on the frame side plates 42 and 44 there is a main camshaft 60 from which various mechanisms of the machine are driven as will be understood from the Butler patent. The camshaft 60 is driven by an electric motor 62, FIGS. 29 and 41, which is controlled by a switch 64, operated from a motor bar 66 which is connected mechanically to the switch, as represented diagrammatically in FIG. 41. Connecting the motor drive shaft to the camshaft 60 there is a conventional one revolution clutch, FIG. 41, which is diagrammatically represented as comprising a clutch member 68, normally held disengaged by a pawl 70 which is actuated by the motor bar 66 to release the clutch at the time that the motor switch 64 is closed. A retractable stop member 72, represented as the movable core of a solenoid 74, prevents the closing of the motor switch 64 and retraction of the pawl 70.

Figure 13:
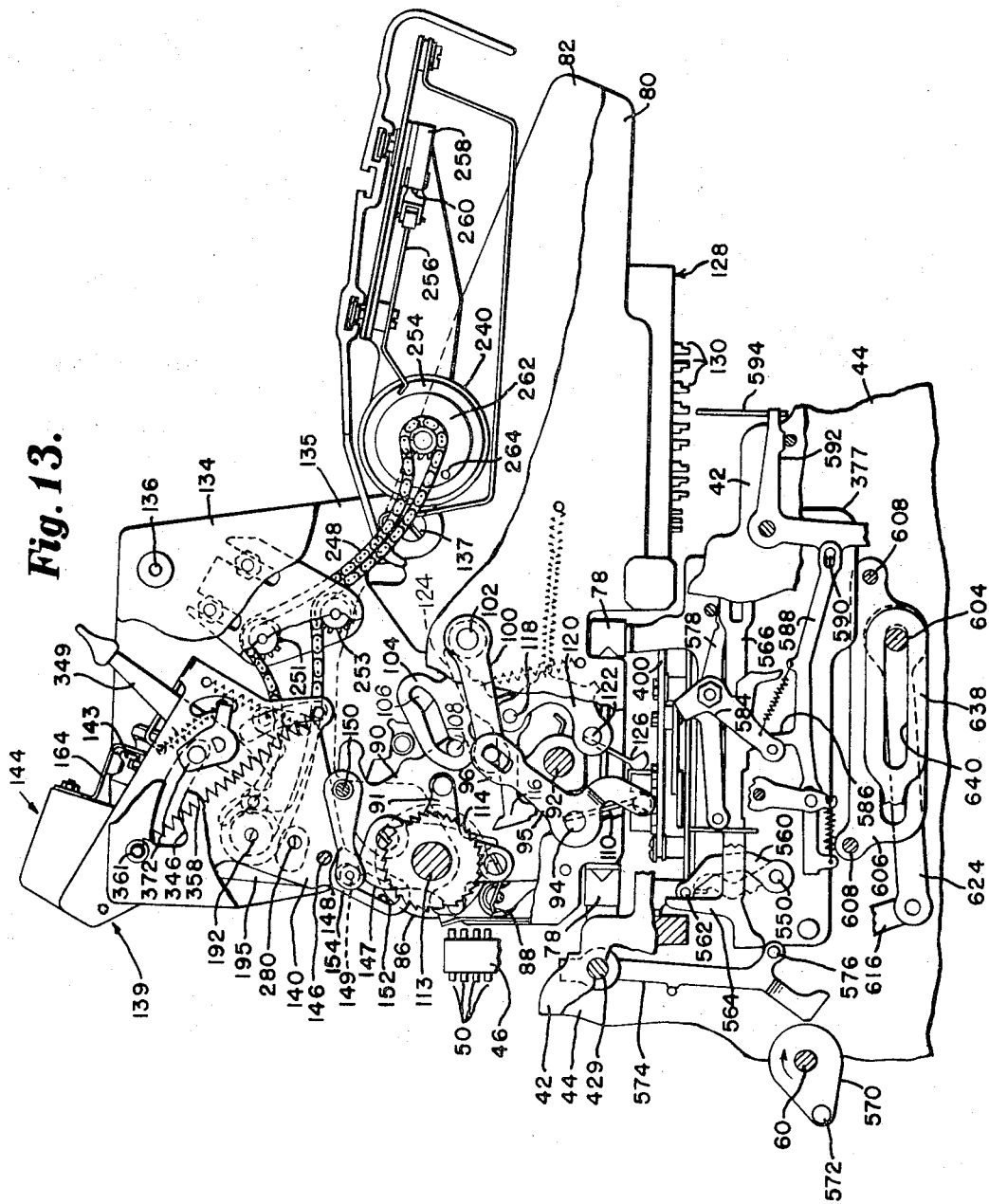
FIG. 13 is a vertical side view, partly broken away and in section of the machine.

The carriage 36 is mounted on guide rails 78, FIG. 13, affixed to the machine frame side plates 42 and 44, for movement or tabulation laterally to selected columnar positions in the performance of posting operations. As is well known, listing operations may also be performed by such machines. Preferably, the carriage 36 comprises an encased frame structure having side plates 80 and 82 rigidly connected together by the usual cross rods (not shown).

A roller type platen 86 is mounted on the carriage 36 and is cooperable with pressure rollers 88 to receive and hold a record sheet therebetween. As is shown more clearly in FIG. 14, the platen 86 is mounted near its ends on a pair of plate-like arms 90 by means of end brackets 91 so as to be movable between a forward print position, engaging the pressure rollers 88, and a rearward, or so-called open throat position. The arms 90 are positioned inwardly of and respectively adjacent the carriage side plates 80 and 82 on which the arms are pivotally mounted by pins or stub shafts 92, FIGS. 13 and 15. Below the platen 86, a rotatable shaft 94 is journaled in the carriage side plates 80 and 82 and affixed to the shaft at each side of the carriage frame there is a lever 95 having an upwardly directed arm 96. The lever arms 96 of the pair of levers 95 are respectively connected by slot and pin connections 98 to the free ends of a pair of arms 100 which are affixed to a transverse shaft 102, rotatably journaled in the carriage frame side plates 80 and 82. Also affixed to the shaft 102, there is a pair of arms 104, FIGS. 13 and 14, having each a cam slot 106 to receive a cam follower 108, carried by and secured to the platen supporting arms 90. By rotating the shaft 94 in a clockwise direction, FIGS. 13 and 15, the cam arms 104 will be pivoted counterclockwise which in turn will pivot the supporting arms 90 clockwise, thus swinging the platen 86 from its printing position, shown in FIG. 13, to its retracted or open throat position shown in FIG. 16. Rotation of the shaft 94 to retract the platen 86 is effected by the operation of a lever or bail 110 which connected to the shaft and is operated from the hereinafter described power transmission mechanism 38.

Figure 14:
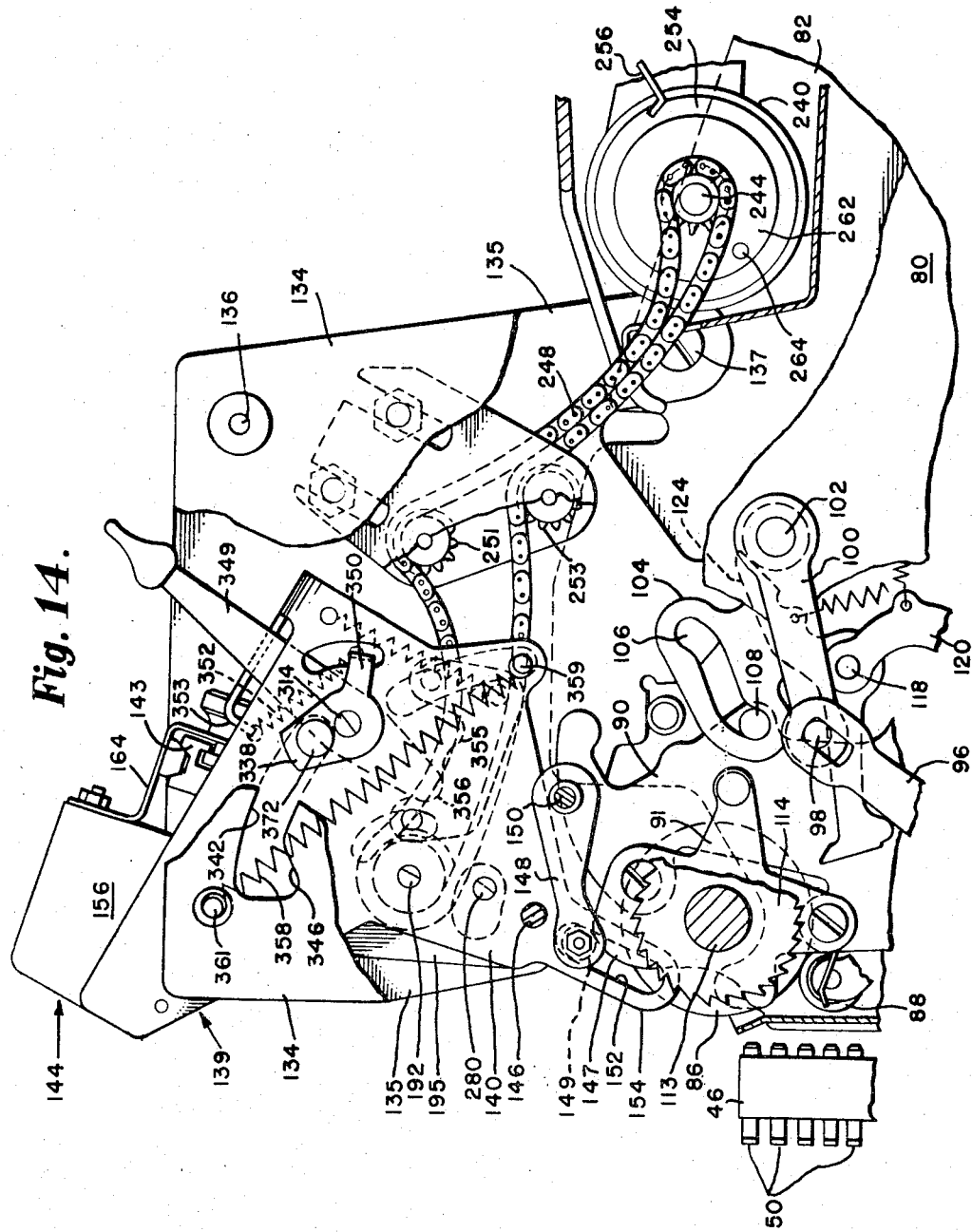
FIG. 14 is an enlarged fragmentary end view of an upper portion of the machine, partly broken away and in section.

To provide for the vertical line spacing of a record sheet, the platen 86 is mounted for rotation on its supporting arms 90 and at one, or the rightward end of the platen shaft, as at 113, there is an indexing mechanism which comprises the usual ratchet wheel 114 and an operating pawl 116, FIGS. 6, 13 and 14. The ratchet wheel 114 is affixed to the platen shaft 113 and the pawl 116 is pivotally mounted intermediate its ends, as at 118, to a pawl operating lever 120 which is affixed onto a rotatable shaft 122, journaled for rotation on the carriage side-plates 80 and 82, FIGS. 13, 14 and 15. An arm 124 of the pawl 116, FIG. 14, bears against a hub of lever 100 to provide a fulcrum about which the pawl can be pivoted into engagement with the teeth of the ratchet wheel 114 with a compound upward and forward motion when the pawl operating lever 120 is pivoted counterclockwise, facing FIG. 14. A lever or bail member 126, FIGS. 13 and 15, is operatively connected to rotate the shaft 122 and is in turn operated from the power transmission mechanism 38 in a manner hereinafter described.

Figure 15:
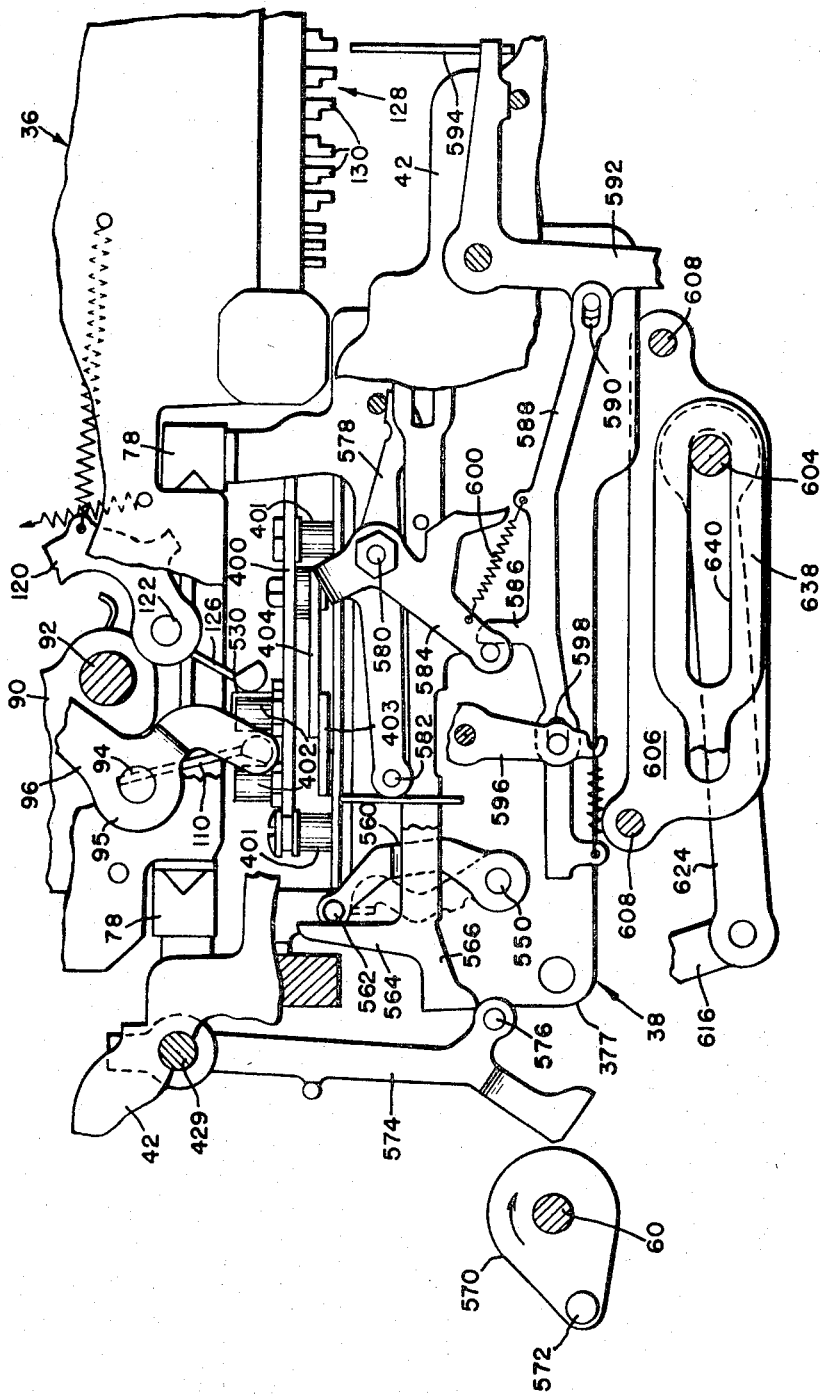
FIG. 15 is an enlarged fragmentary end view of a lower portion of the machine, partly broken away and in section.

Mounted on the underside of the carriage 36, FIG. 1, 13 and 15, there is a program device 128 for automatically controlling the opening and closing operations of the carriage platen 86 and for automatically controlling rotation of the platen 86 to effect line spacing of a record sheet by the platen when called for by the program. The program device 128 is of the well known type in which pins 130 are arranged to effect operation of the machine and this program device is shown and described in detail in the aforementioned Butler patent.

A record sheet handling apparatus is provided for feeding a sheet to the platen 86 and stopping the sheet preparatory to presenting the next unused line of the sheet to the printing position. The sheet handling apparatus is mounted, as a unitary structure, on and above the carriage 36 by means of a mounting frame including laterally spaced apart side plates 134 and 135 and a connecting cross rod 136. The mounting frame is normally stationary relative to the carriage 36, but is preferably mounted such that it can be swung upwardly and rearwardly to a position to provide ready access to mechanisms of the sheet handling apparatus and also of the accounting machine. To this end, the frame structure is mounted on a pair of aligned stub shafts 137 which are respectively secured to the frame side plates 134, 135 to function as trunnions for the unitary structure. The structure may be held down in its normal position by any suitable well known latch or other means.

Figure 16:
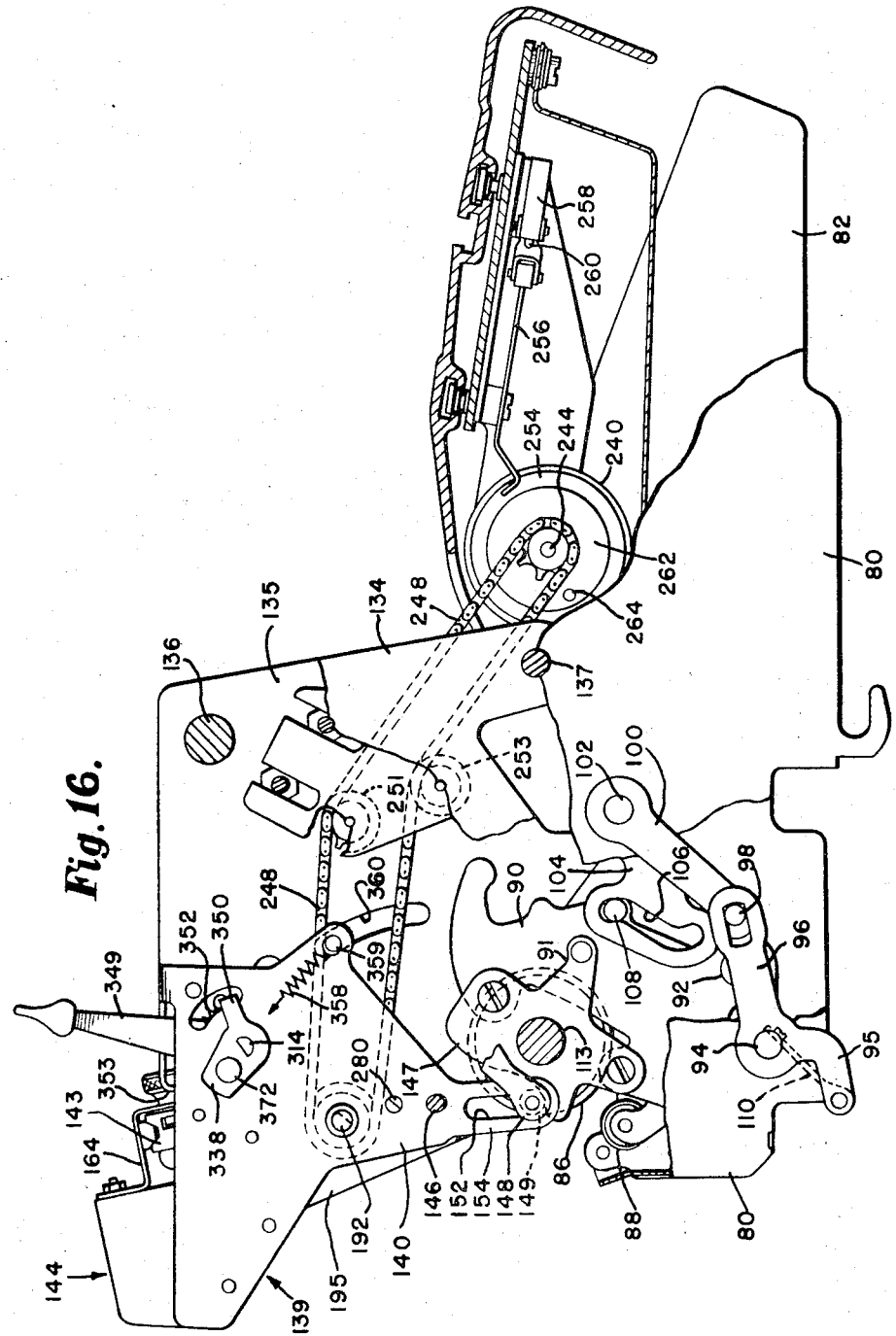
FIG. 16 is a fragmentary rightward side view of the machine, partly broken away and in section.

Mounted on and between the stationary frame side plates 134, 135 there is a tiltable frame, designated generally by the numeral 139, which includes a pair of plate-like side arms 140, 141 and connecting cross members or rods 142. Also, the frame 139 includes a horizontal rail 143 which is secured at its opposite ends respectively to the arms 140, 141 and on which is mounted a pair of horizontally spaced apart side guide members 144 and 145 for receiving and guiding a record sheet. The frame 139 is tiltably mounted on the stationary side plates 134 and 135 by stub shafts or pivot pins 146, as shown for example, in FIGS. 6, 7, 14 and 16, such that the frame may be tilted between forward and rearward positions about the pins 146. The forward position of the frame 139 provides for the convenient insertion of a record sheet between the side guide members 144 and 145 and corresponds to the retracted or open position of the platen 86. The tilting of the frame 139, like the movement of the platen 86 is effected by the platen carrying arms 90. To this end, a cam 147, FIG. 16, is provided on the periphery of each of the pair of platen mounting brackets 91 for engagement by roller type cam followers 149, carried on the free ends of each of a pair of arms 148, which arms are pivoted, as at 150, respectively on the side frame members 134, 135. The cam followers 149 engage in a slot 152 which is provided in a downwardly extended portion 154 of each of the tiltable arms 140 and 141. Thus, it will be seen that when the platen 86 is moved from its print or closed position of FIG. 14, rearwardly to its open throat position of FIG. 16, the cams 147 allow the frame 139 to tilt counterclockwise, and conversely, when the platen 86 is moved forwardly to its print position of FIG. 14, the frame will be tilted rearwardly or clockwise.

Figure 21:
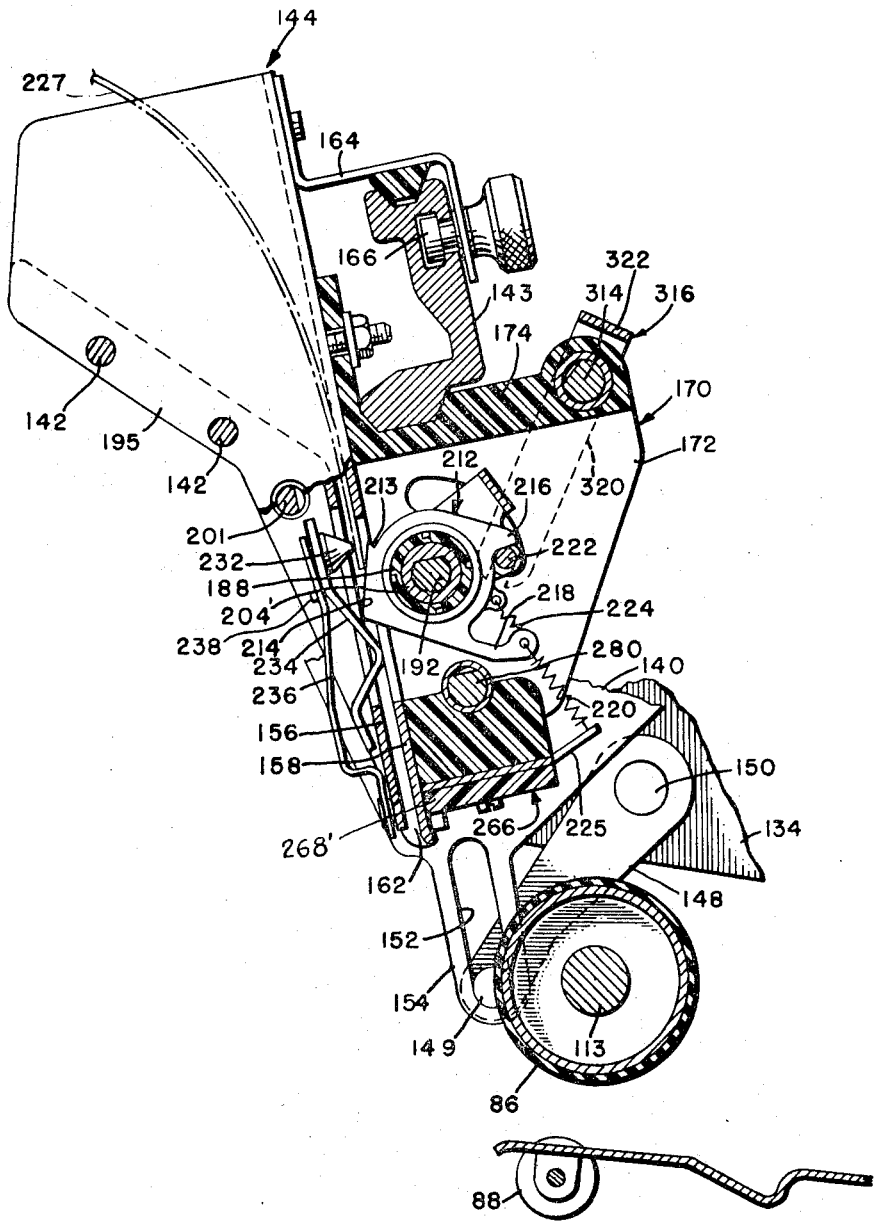
FIG. 21 is a vertical sectional view, taken along the line 21—21 of FIG. 18 and showing operating parts in their normal or home positions.

The sheet guide member 144 comprises a pair of upright plates including a front guide plate 156 and a rear guide plate 158 joined together by a side web 160, and the plates are spaced apart in broadside relationship to provide one part of a guideway 162 for a record sheet, FIG. 21. The sheet guide member 144 is positioned forwardly of its mounting rail 143 and is preferably mounted on the latter by a bracket 164 which may be clamped to the rail by a thumb screw held clamp member 166 to provide for adjustability of the guide members along the rail so as to accommodate various widths of record sheets. A channel-like recess in the back and extending longitudinally of the rail 143 is provided to receive the clamp member 166. Secured to the back of the rear guide plate 158 there is a mounting member 170 having spaced side members 172 joined together by an upper cross web 174.

Figure 11:
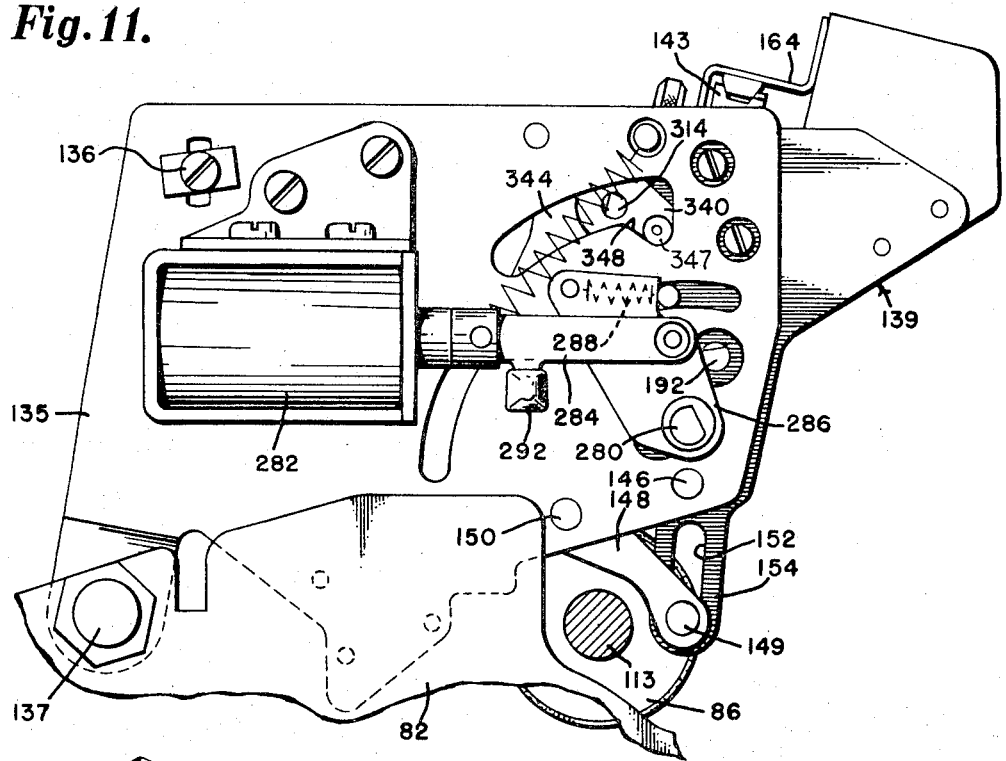
FIG. 11 is a fragmentary elevational view of the leftward side of the machine.

The sheet guide member 145, FIG. 27, is similar to the guide member 144 and includes a front guide plate 176 and a rear guide plate 178 clamped to the rail 143 by a thumb screw held clamp member to provide for adjusting the position of member 145 along the rail, see also FIG. 11. Rigidly secured to the back of the rear guide plate 178 there is a mounting member 182, which, like the mounting member 170, has spaced apart side members 184, joined together by an upper cross web 186.

Figure 17:
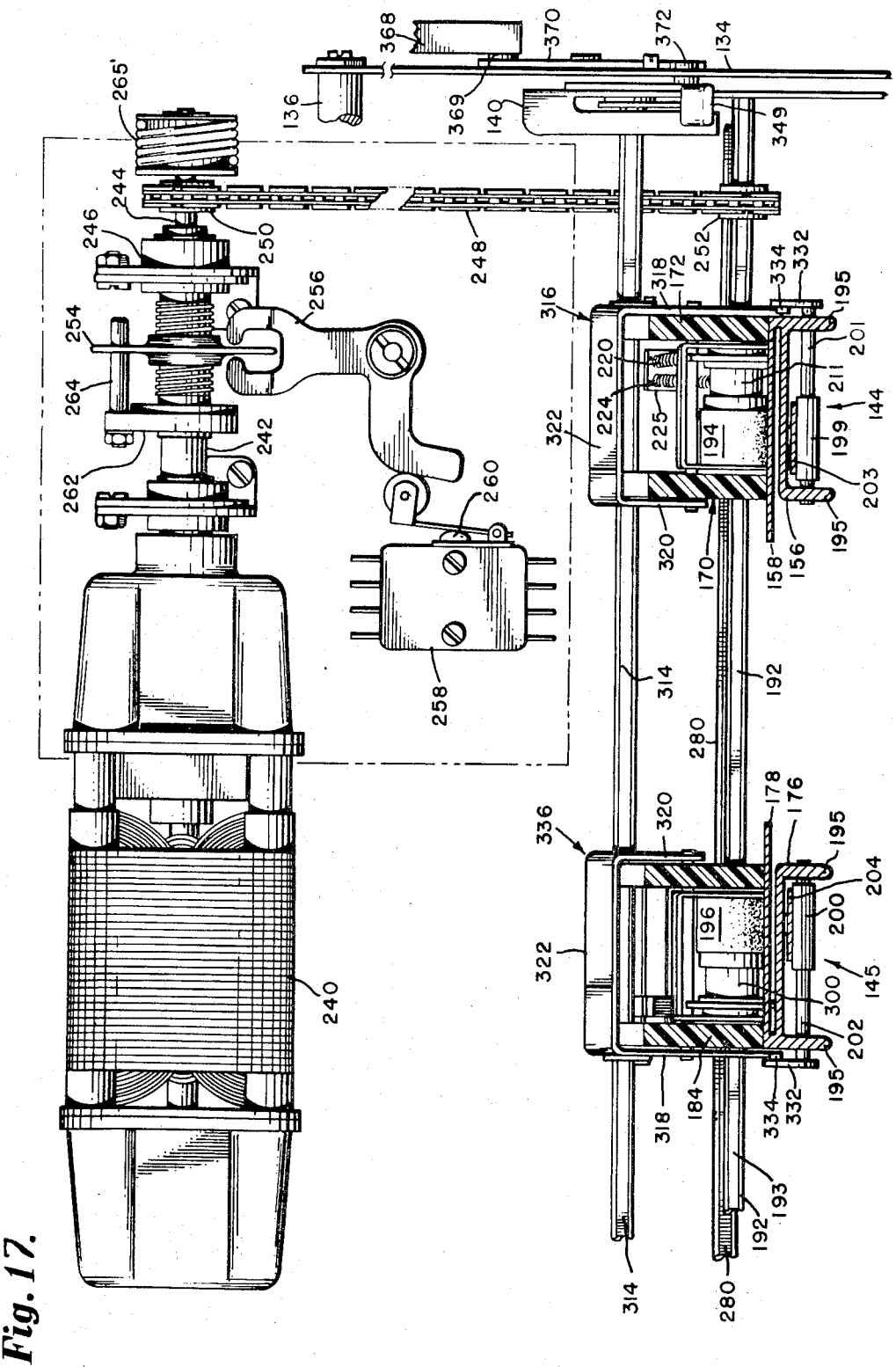
FIG. 17 is a plan view partly broken away and in section.
Figure 18:
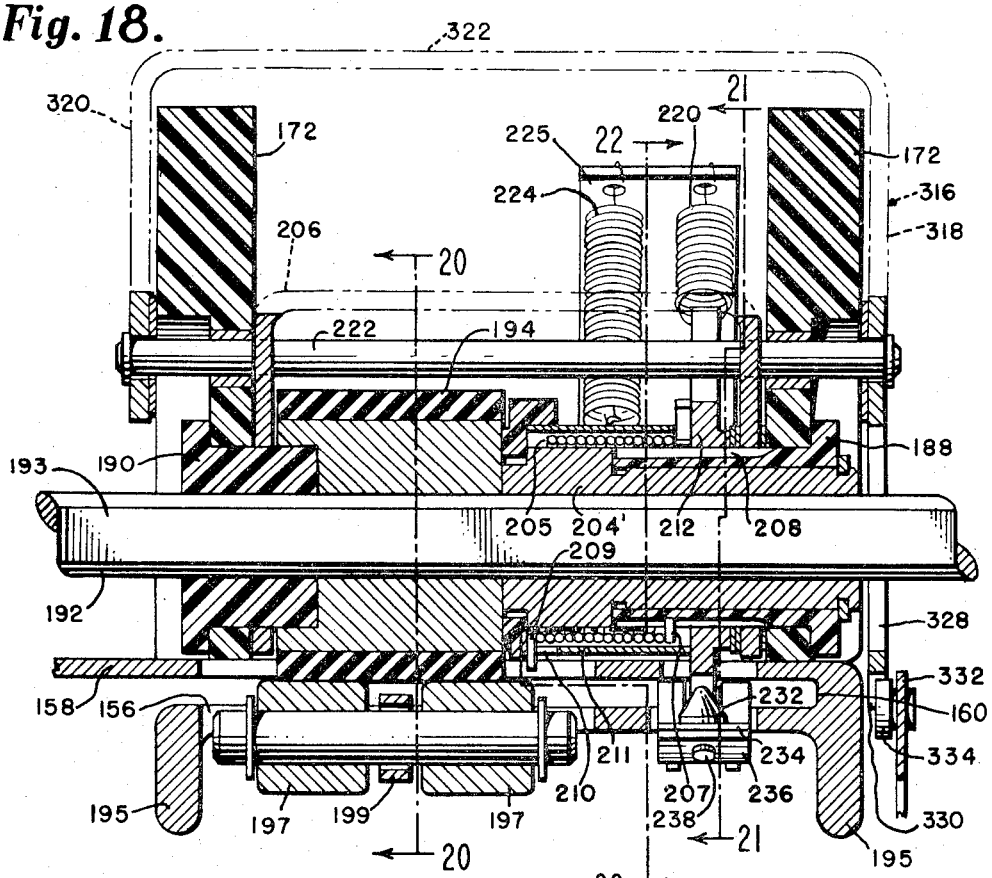
FIG. 18 is a horizontal sectional view, taken along the line 18—18 of FIG. 6.
Figure 19:
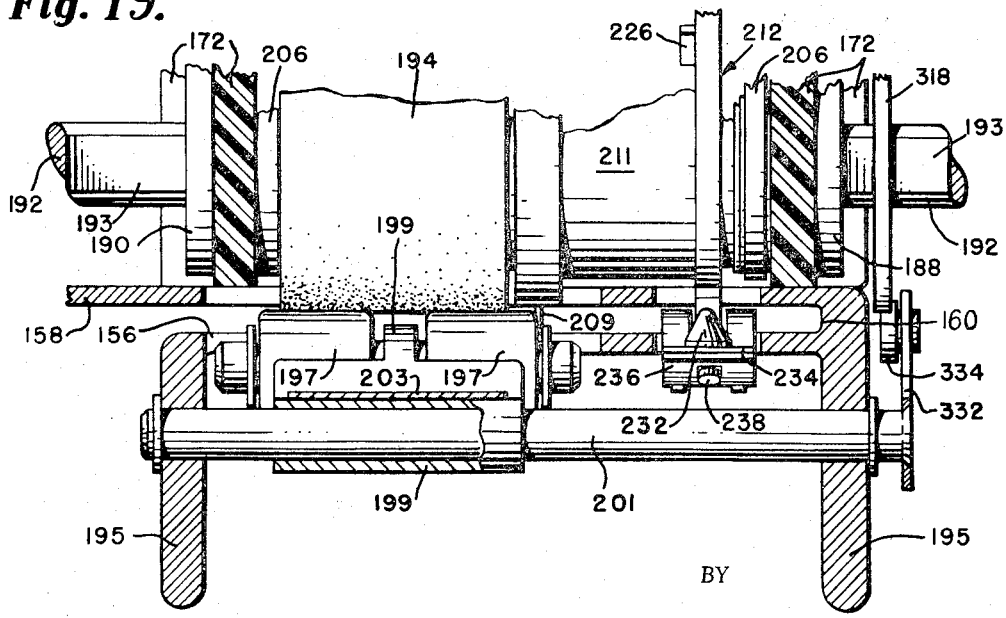
FIG. 19 is another horizontal sectional view, taken along the line 19—19 of FIG. 26.
Figure 20:
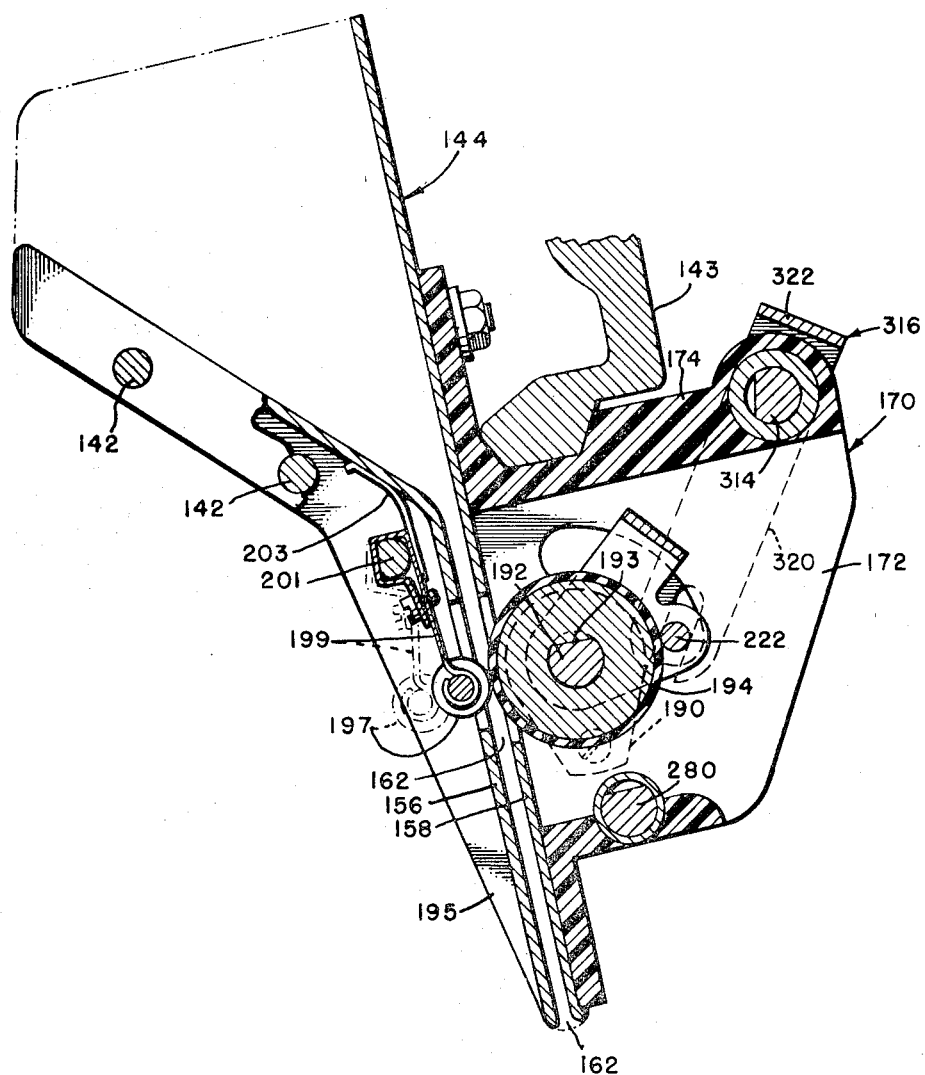
FIG. 20 is a vertical sectional view, taken along the line 20—20 of FIG. 18.

In the side members 172 and 184, FIG. 18, are aligned clearance apertures to receive bushings 188 and 190 for a horizontal driven shaft 192 which extends through clearance holes in the opposite frame side arms 140 and 141, the shaft being held against axial movement by clip-on retainers. On and rotatable with the shaft 192 there is a pair of axially spaced apart sheet feed rollers 194 and 196 of which roller 194 is positioned between the side members 172 of the mounting 144, and roller 196 is positioned between the side members 184 of the guide member 145, FIG. 17. The peripheral contour of the shaft 192 includes a flat portion 193 that extends longitudinally thereof and the inner peripheries of the hubs of sheet feed rollers 194 and 196 conform, or are complementary to the cross sectional shaft contour, as shown in FIG. 20 to provide a driving connection with the shaft irrespective of the adjusted position of the guide members 144 and 145 along the shaft.

The sheet feed rollers 194 and 196 project into the sheet guideway 162 through clearance openings in the guideway plates 158 and 178 to engage respective pairs of pressure rollers 197 and 198, FIGS. 17 to 20. The pressure rollers 197 and 198 are mounted forwardly of the front guide plates 156 and 176 on the lower ends of arms 199 and 200 which have their upper ends affixed respectively to horizontal shafts 201 and 202, journaled for rotation in and to side flanges 195 of the front guideway plates 156 and 176. A pair of leaf springs 203 and 204 are provided, respectively to yieldingly urge the pairs of pressure rollers 197 and 198 against the feed rollers 194 and 196. By this arrangement, the shafts 201 and 202 may be rotated against the action of the springs 203 and 204 to move the pressure rollers 197 and 198 away from the feed rollers 194 and 196 to render sheet feeding ineffective so as to release a record sheet.

Referring now more particularly to FIGS. 18 and 21, a brake mechanism is provided to stop the driven shaft 192 and thus the sheet feed rollers 194 and 196 and includes the bushing 188 which also functions as a stationary brake drum. In addition, the brake mechanism includes a rotatably driven drum 204' and a helical coil spring 205. The brake mechanism is located between the mounting side flanges 172 with the bushing or drum 188 affixed in and to the outer mounting flange 172 and with the drum 204' affixed onto the feed roller driven shaft 192. Thus, the shaft 192, the brake and feed roller 194 are mounted on the mounting member 170 and, as a unit, are suspended or hung from the rail 143 by the side guide members 144 and 145 functioning as hangers. The stationary brake drum 188 and the bushing 190 for shaft 192 are preferably further supported by a U-shaped bracket or yoke type connector 206. As shown, the stationary drum 188 receives a reduced end portion of the rotatable drum 204', the drums having flush outer peripheries surrounded by the brake spring 205. One end of the spring 205 is provided with a laterally projecting tang 207 which engages in one of a number of circumferentially spaced apart grooves or notches 208 which are provided in the periphery of the stationary drum 188 for spring adjustment purposes, and the other end of the spring is provided with a similar tang 209 which engages in a slot 210 in a rotatable connecting member 211 in the form of a sleeve which surrounds the spring coaxially thereof.

Mounted for rotation on the stationary brake drum 188 there is a brake operator or lever 212, FIGS. 18 and 21 to 25, which, in the present brake, is made of plate or sheet stock having a peripheral edge formed to provide an arm or abutment 213, a cam 214, a second arm 216 and a third arm 218. The brake operator 212 has a normally ineffective or retracted position, shown in FIGS. 21 and 22, in which the arm 213 is positioned without the sheet guideway 162 and the cam 214 is positioned within the guideway, the cam 214 extending downwardly from arm 213 and across the guideway for engagement by the leading edge of a sheet, as illustrated. A coil spring 220, attached to arm 218, yieldingly holds the brake operator 212 in the above mentioned ineffective position with the arm 216 against a stop abutment of rod 222, the spring urging the brake operator 212 in a counterclockwise direction as viewed, for example, in FIG. 22.

Figures 22, 23:
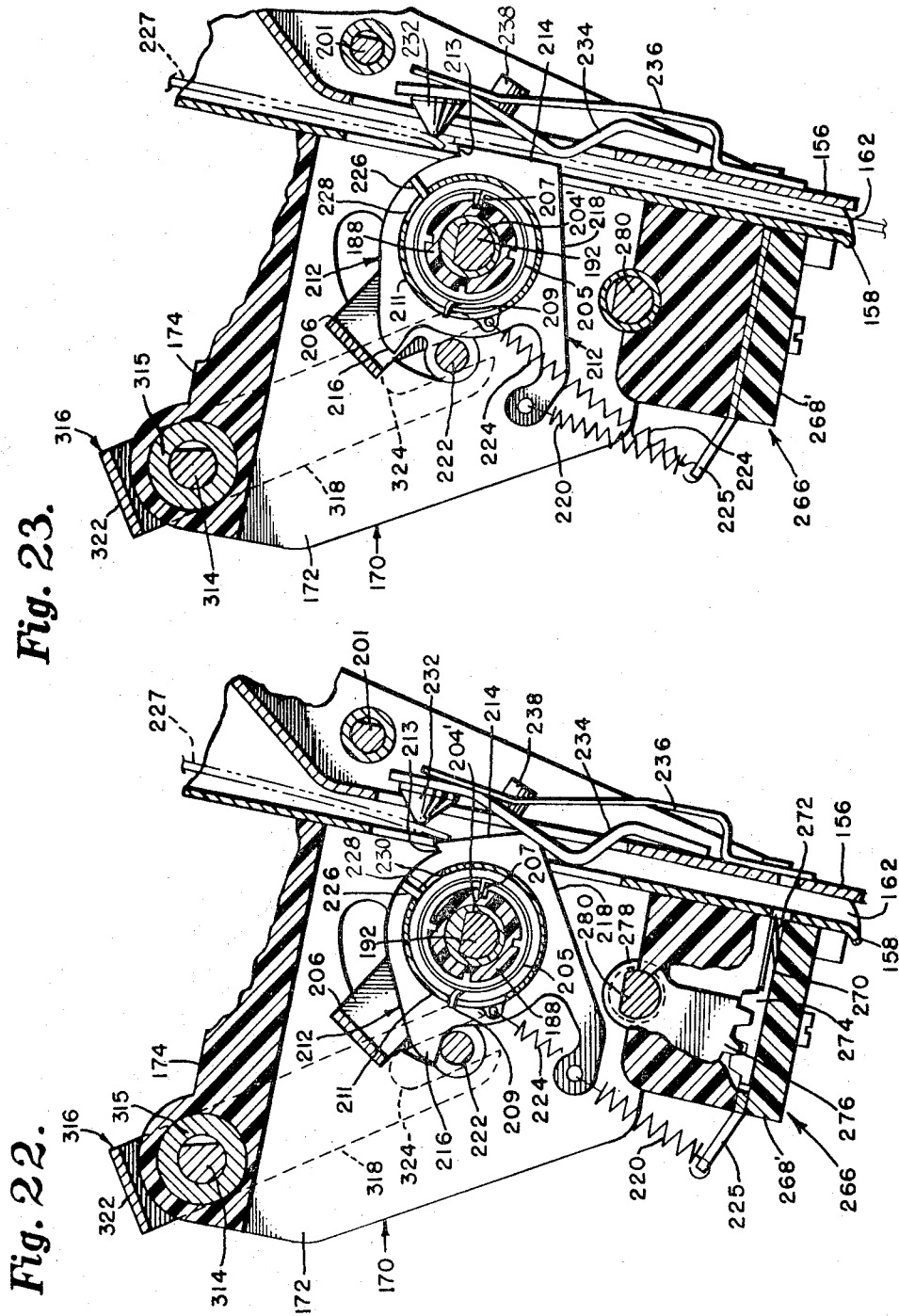

The brake spring 205 is made such that in its normal or contracted state, the inner diameter thereof is less than the diameters of the drums 188 and 204' so that the spring has a potential contractile force to grip both drums except that normally another spring 224 counteracts the spring 205 and holds it in its circumferentially expanded or disengaged position, shown in FIG. 22. The spring 224 has one end thereof attached to the rotatable sleeve 211 at an angle to urge the sleeve counterclockwise, as viewed in FIG. 22, against the brake spring tang 209 in a direction tending to unwind the brake spring or expand it away from the drums 188, 204'. The other end of the spring 224 is anchored to a bracket 225, as is also one end of the brake operator return spring 220.

The brake operator 212 is operatively connected to the sleeve 211 by an abutment member or lug 226 which extends laterally from one side of the operator into a slot 228 in the sleeves, the sleeve thus operatively connecting the spring 205 to the operator. The slot 228 extends circumferentially of the sleeve 211 and provides a delayed or lost motion connection between the sleeve and the operator 212 when the latter is rotated clockwise, by the leading edge of a sheet, to the effective brake operating position, shown in FIG. 23. Effective connection between the brake operator 212 and the sleeve 211 is obtained when the lug 226 engaging against the end 230 of slot 228 rotates the sleeve clockwise whereupon to overcome spring 224, thus freeing and allowing the brake spring 205 to contract and stop the rotatable brake drum 204'.

In FIGS. 3 and 4 there is shown a fragment of a record sheet 227 which is particularly suitable for use with automatic line find apparatus of the above described type. Adjacent the rightward edge of the sheet 227 there is shown a vertical column of horizontally extending slit-like perforations 229 which designate lines of print that have been printed on the sheet, and the lowermost slit, or slit 229', designates, of course, the last line of print or entry made on the sheet. The column of line designating slits is located in the sheet 227 such that they align with the slit sensor or tip of the brake operator arm 213.

In order to insure that the brake operator arm 213, when in sensing position, FIG. 23, within the sheet guideway 162, will be engaged by an upper edge portion of the sheet slit, designating the last line of print on the sheet, a sheet slit opener or displacement member in the form of a conical abutment member 232 is preferably provided. The abutment member 232 is located forwardly of the guideway 162 and is affixed at its larger end to the upper end of an arm 234 which is mounted on a leaf spring 236, secured at its lower end to the front sheet guide plate 156. Preferably, the arm 234 is mounted on the leaf spring 236 by means of a pin 238 which extends through an aperture in the leaf spring to allow for slight movement of the abutment member 232 relative to said spring such that the member 232 has a floating mounting on the spring. The spring 236 is tensioned by a record sheet moving down the guideway 162 into engagement with the abutment member 232 and the member 232 is preferably conical in shape to facilitate the tensioning of the spring by the sheet. The abutment member 232 is positioned just above the brake operator 212 and it will be seen that the member 232 under the sheet applied tension of spring 236, will open the last print line designating slit 229' such that the upper edge of the slit will be displaced laterally in position to engage and operate the brake operator 212.

The sheet feed roller shaft 192, FIG. 17, is driven by a reversible A.C. electric motor 240 having a driving shaft comprising a pair of shaft components 242 and 244. The shaft component 242 is tubular to receive the shaft component 244 and the components are connected together by a slip clutch 246 which may be of any suitable well known type. The shaft 192 is driven from the shaft component 244, preferably by a drive chain 248 and chain sprockets 250 and 252 respectively affixed to the shafts 244 and 192. Intermediate upper and lower idler sprockets 251 and 253 are provided to support the chain 248, particularly when the chain is slackened on tilting of the line find apparatus to its rearward position as shown in FIG. 14. The tubular shaft component 242 is externally threaded to receive a switch operator or nut 254 which engages an operating arm 256 of a switch housed in a casing 258 from which projects one end of a switch operating plunger 260. A disc 262, affixed to shaft 242, carries a rod 264 which extends parallel to the shaft and through a bore in the nut 254 in slip fit relationship therewith and, it will be understood that when application of the brake stops the driven shaft component 244, the nut 254 will be moved longitudinally along the shaft 242 by the continued rotation thereof and pivot lever 256 to depress the switch plunger 260. This switch is connected to the motor 240, FIG. 41, such that depression of the switch plunger 260 opens the switch to stop the motor. Preferably a spring shock absorber 265', of any suitable type, is provided and connected to the driven shaft component 244.

*Line find operation*

Assuming that the platen 86 is in its retracted or open throat position, shown in FIGS. 16 and 21, the supporting frame 139 of the sheet handling mechanism will be in its forwardly tilted position to receive a record sheet, the sheet feed rollers 194, 197, FIG. 20, will be engaged and the brake operator 212 will be in the retracted position, shown in FIG. 22. With the parts in their above mentioned normal positions, a record sheet placed between the side guide members 144, 145 will descend to the bight of the feed rollers 194 and 197 and be fed downwardly thereby between the platen 86 and its pressure rollers 88. As the sheet is fed downwardly, its leading edge first engages the conical abutment member 232 and cams the member to the right, facing FIG. 22, which places the biasing spring 236 under tension. At about the same time that the sheet tensions the spring 236, the leading edge of the sheet engages the cam surface 214, of the brake operator 212 and rotates the latter to its effective position shown in FIG. 23 in which the slit sensing arm 213 projects into the sheet guideway. When the line designating slit 229' is opposite the conical abutment member 232, the tension of the spring 236 is sufficient to open the slit and displace the upper edge thereof into position to engage the sensing tip 213 of the brake operator 212. It will be noted that when the brake operator 212 was rotated from its ineffective position of FIG. 22 to its effective position of FIG. 23, the sleeve 211 was not rotated thereby because of the lost-motion connection of the operator abutment 226 in the circumferential slot 228 of the sleeve 211. That is, the abutment 226 moved in a clockwise direction from one end of the slot 228 substantially to the other without imparting any rotary motion to the sleeve 211, thus to avoid operation of the brake as the brake operator is moved to its effective position. However, as the record sheet moves further down its guideway 162, the sheet rotates the operator 212 further in a clockwise direction and also rotates the sleeve 211 in like direction through the abutment of lug 226 and the end 230 of the sleeve. Clockwise rotation of the sleeve 211 overcomes the spring 224 which allows the brake spring 205 to contract to engage and stop the brake drum 204' and consequently the driven feed roller shaft 192. This stops the record sheet in a position relative to the print line. When the shaft 192, FIG. 17, is stopped by the application of the brake, the slip clutch 246 becomes ineffective, as a drive, as above mentioned, and continued rotation of the driving shaft component 242 causes the nut 254 to move rightwardly along the shaft component and pivot lever 256 clockwise so as to operate switch 258 and stop the motor 240.

Figure 12:
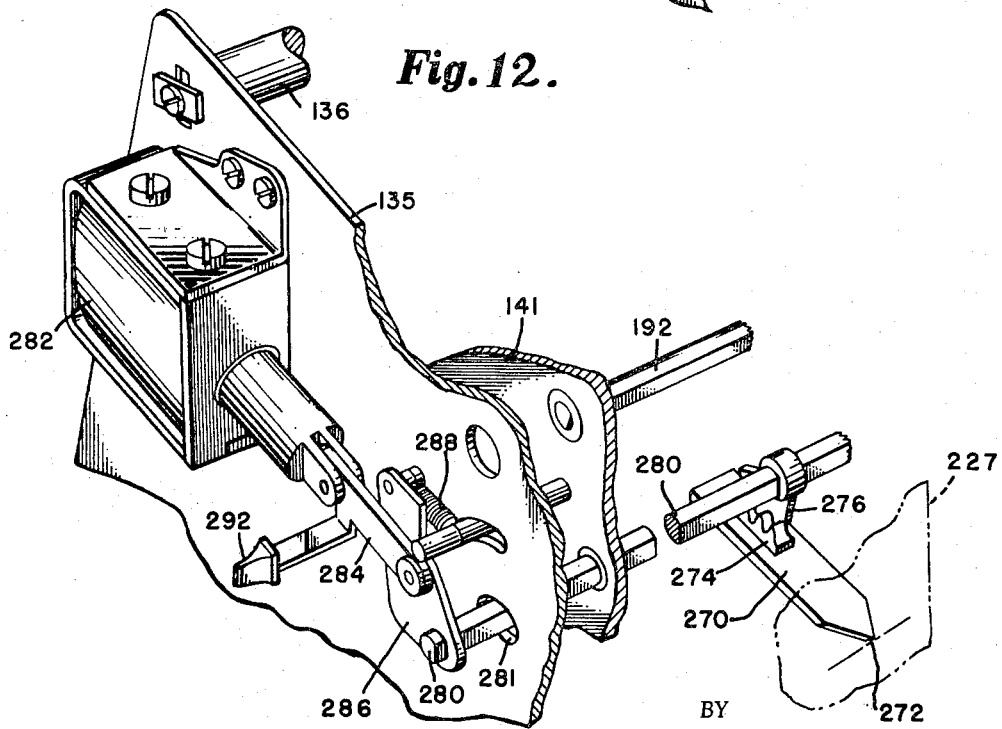
FIG. 12 is a fragmentary perspective view of the leftward side of the machine.
Figure 40:
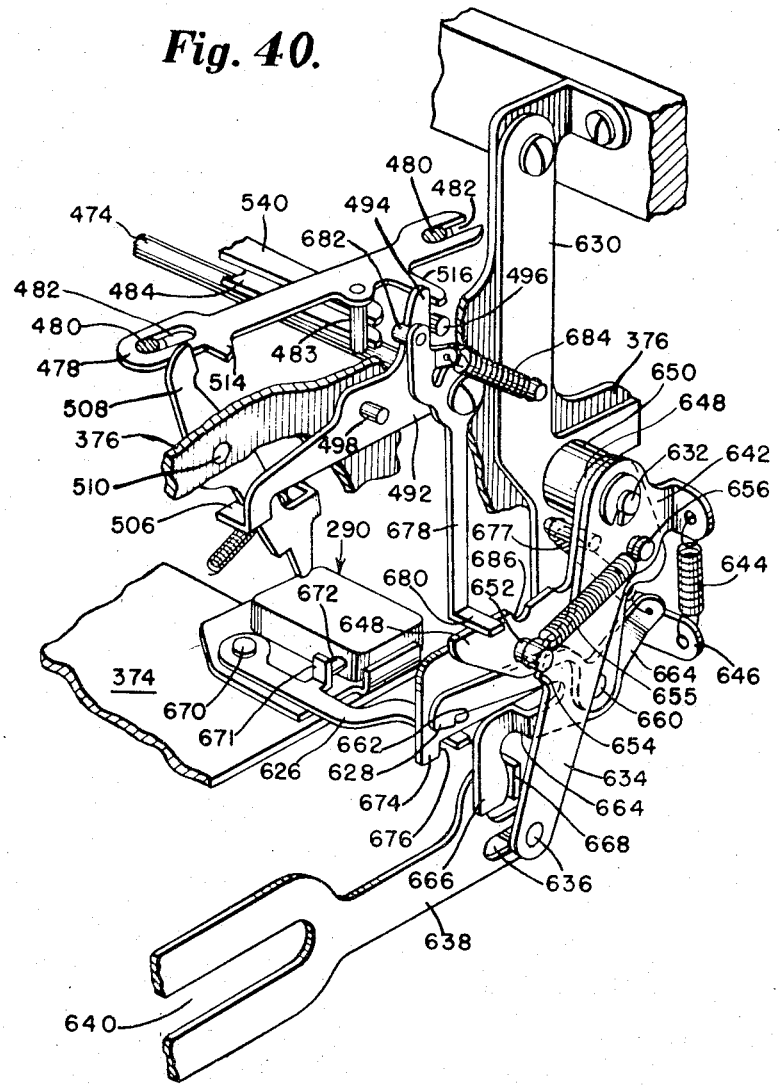
FIG. 40 is a fragmentary perspective view of the transmission mechanism, operating and control mechanisms.
Figure 41:
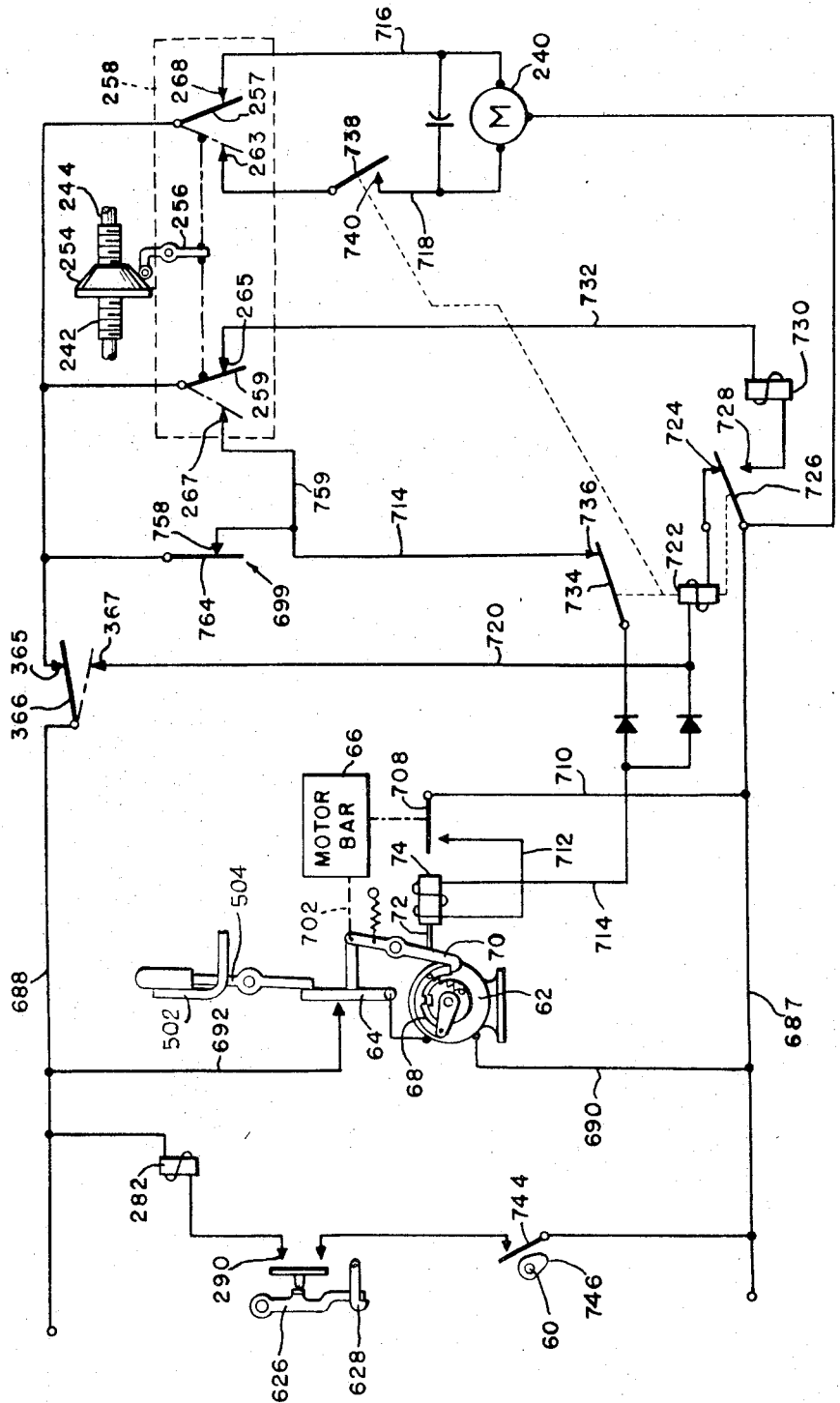
FIG. 41 is a diagrammatical illustration of certain electrically operated devices and circuitry therefor.

A sheet perforator, designated generally by the numeral 266, is provided for piercing a line designating slit in a record sheet during each printing operation and includes a mounting member or body 268' which is suitably secured to the guide plate 158, below the brake operator 212. Slidably guided within the body 268' there is a perforator member or blade 270 having a paper piercing edge 272 at one end thereof with the blade edge horizontally disposed. The blade is directed toward the record sheet guideway 162 wherein aligning clearance openings are provided for the blade. The blade 270 is normally retracted, as shown in FIG. 22, without the guideway. A gear rack 274 seats on and is connected to the blade 270 and a gear segment 276 is in mesh with the gear rack. The gear segment 276 is on an arm 278 which is affixed to a rotatable shaft 280 which is journaled for rotation in the side arms 140 and 141 of the tiltable frame structure. The shaft 280 extends through an arcuate clearance slot 281 in the stationary end plate 135 and is operatively connected to an electrically operated actuator or solenoid 282 which is mounted rigidly on the side plate 135 as shown in FIGS. 11 and 12. An extension member or link 284 is connected at one end thereof to the usual movable armature or core of the solenoid 282 and at the other end to an arm 286 which is affixed to the rotatable shaft 280. A return spring 288 is connected to the lever and anchored to the side plate 135. A switch 290, FIGS. 31, 40 and 41, is provided to control the solenoid 282 and operation of the switch is dependent upon whether a carriage opening and/or a line spacing operation was effected on the next preceding cycling operation of the machine, the switch operation being hereinafter described in detail. The perforator member 270 may also be manually operated and for the convenience of the machine operator, a laterally extending handle 292 is provided, the handle being connected to or integral with the solenoid extension member 284.

With reference to the leftward side guide member 145 and particularly to FIG. 27, there is associated with the guide member a brake, designated generally by the numeral 294, which functions, as will be later understood, to operate controls to effect a reverse operation of the sheet feed motor 240 for ejecting a sheet from the platen 86. The brake 294 is similar to the previously described brake in having a stationary brake drum 296, a rotatable brake drum 298 and a helical coil brake spring 300. The stationary brake drum 296 is mounted on the mounting member 182 and is tubular to receive the driven shaft 192 and to receive a reduced portion of the rotatable brake drum 298 which is affixed onto the shaft. The brake spring 300 surrounds both outer peripheries of the drums 296 and 298 and is normally contracted thereabout in the brake applied position, as shown. A brake operator 302 is rotatable on the stationary brake drum 296 and may be made of plate or sheet stock having an arm 304 which normally projects into the sheet guideway, as shown, for engagement by the leading edge of a record sheet moving down the guideway. One end of the brake spring 300 is formed to provide a tang 306 which engages in a selective one of a number of circumferentially spaced notches provided in the periphery of the stationary brake drum 296. On its other end, the spring 300 is provided with a tang 308 which engages in an aperture in a rotatable connection member or sleeve 310, journaled for rotation on the mounting member 182. A lug 312 on the brake operator 302 engages in a circumferentially extending slot in the sleeve 310 to effect operative connection between the brake operator 302 and the spring 300. The leading edge of a sheet moving down in the guideway 162 engages arm 304 and rotates the operator 302 clockwise as viewed in FIG. 27 which rotates sleeve 310 in the same direction and the sleeve, acting against the spring tang 308, expands the spring to remove the normally effective braking force.

As shown in FIGS. 20 to 27, a rotatable horizontal shaft 314 extends through aligning apertures in the mounting member webs 174 and 186 and is journaled for rotation in bushings 315 in the webs. The shaft 314 also extends through the opposite side frame arms 140 and 141, but like shaft 192 is not journaled in the side frame. Mounted on the shaft 314 there is a bail type lever 316 having a pair of parallel arms 318 and 320 connected together by a web 322. The shaft 314 has a flattened portion extending throughout its length and the bail arms 318 and 320 have aligned apertures receiving and conforming in shape or complementary to the cross sectional contour of the shaft so that the shaft and bail will rotate together and so that the side guide members 144 and 145 can be freely moved along the shaft when adjusting the position of the side guide members to sheet width. The bail arms 318 and 320 extend downwardly and forwardly astraddle the mounting member 170 and are provided with slots 324 and 326 respectively which extend longitudinally of the arms and receive the brake operator abutment rod 222. As previously mentioned, an arm 216 of the brake operator 212 is yieldingly held in contact with the rod 222 by the coil spring 220 and it will be seen that rotation of the shaft 314 clockwise, facing FIG. 21 will cause the rod 222 to move through an arc in a clockwise direction and pivot the brake operator 212 to a second ineffective or retracted position. The second or ineffective position of the brake operator 212 is shown in FIG. 25 wherein it will be seen that the brake operator sensing arm 213 has been moved to a position without the sheet guideway.

Figure 26:
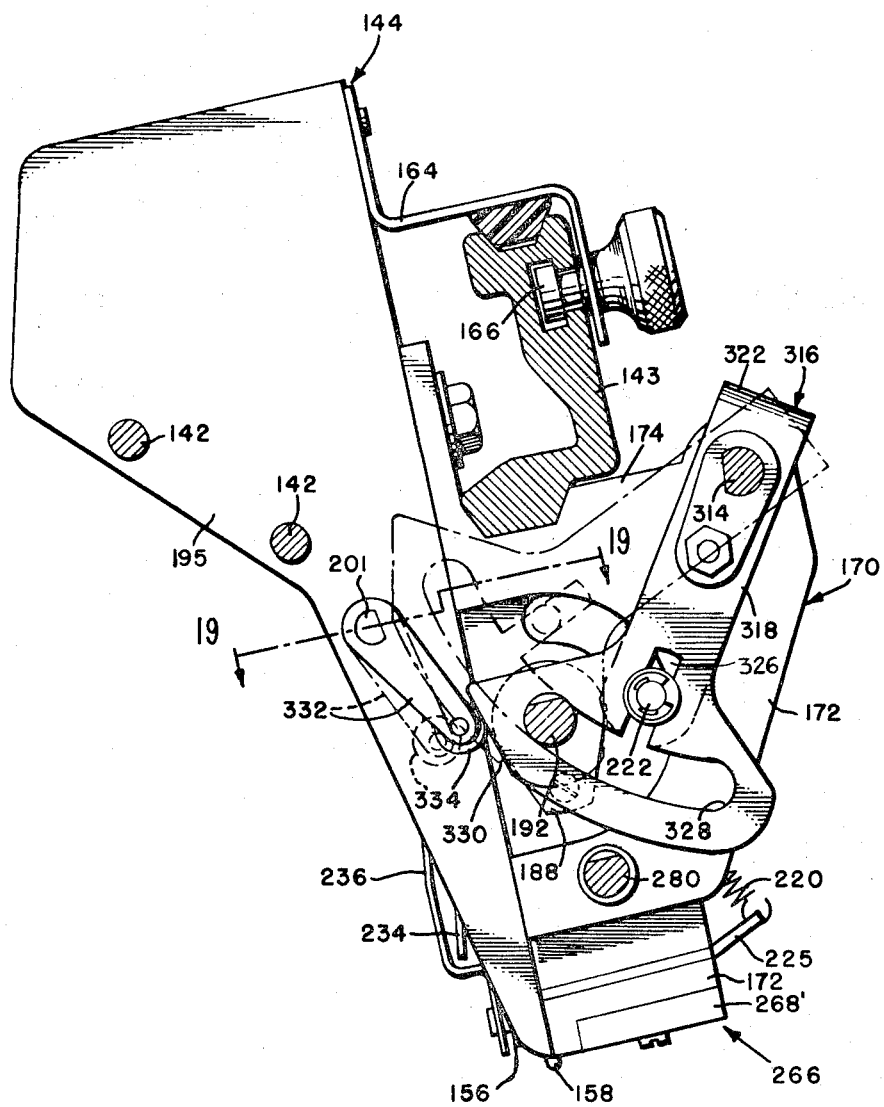
FIG. 26 is a vertical sectional view, taken along the line 26—26 of FIG. 6.

As shown in FIG. 26, the lower end of the bail arm 318 is enlarged and is provided with an arcuate clearance slot 328 for the feed roller shaft 192, and on the lower edge of the arm 318, a cam 330 is provided to rotate the shaft 201 by pivoting a crank arm 332. The crank arm 332 is affixed to the shaft 201 and on its free end preferably carries a roller 334 for engaging the cam 330. Thus, when the bail operating shaft 314 is rotated clockwise, facing FIG. 26, the cam 330 rocks the crank arm 332 clockwise which rotates shaft 201 in like direction to move the pressure rollers 197, FIG. 20, away from the sheet feed rollers 194.

A second bail 336, similar to the above described bail 316, is provided to retract the brake operator 302 and the pressure rollers 198, associated with the leftwardly positioned side guide member 145, and like reference characters have been applied to like parts to void unnecssary repetitious description.

Figure 7:
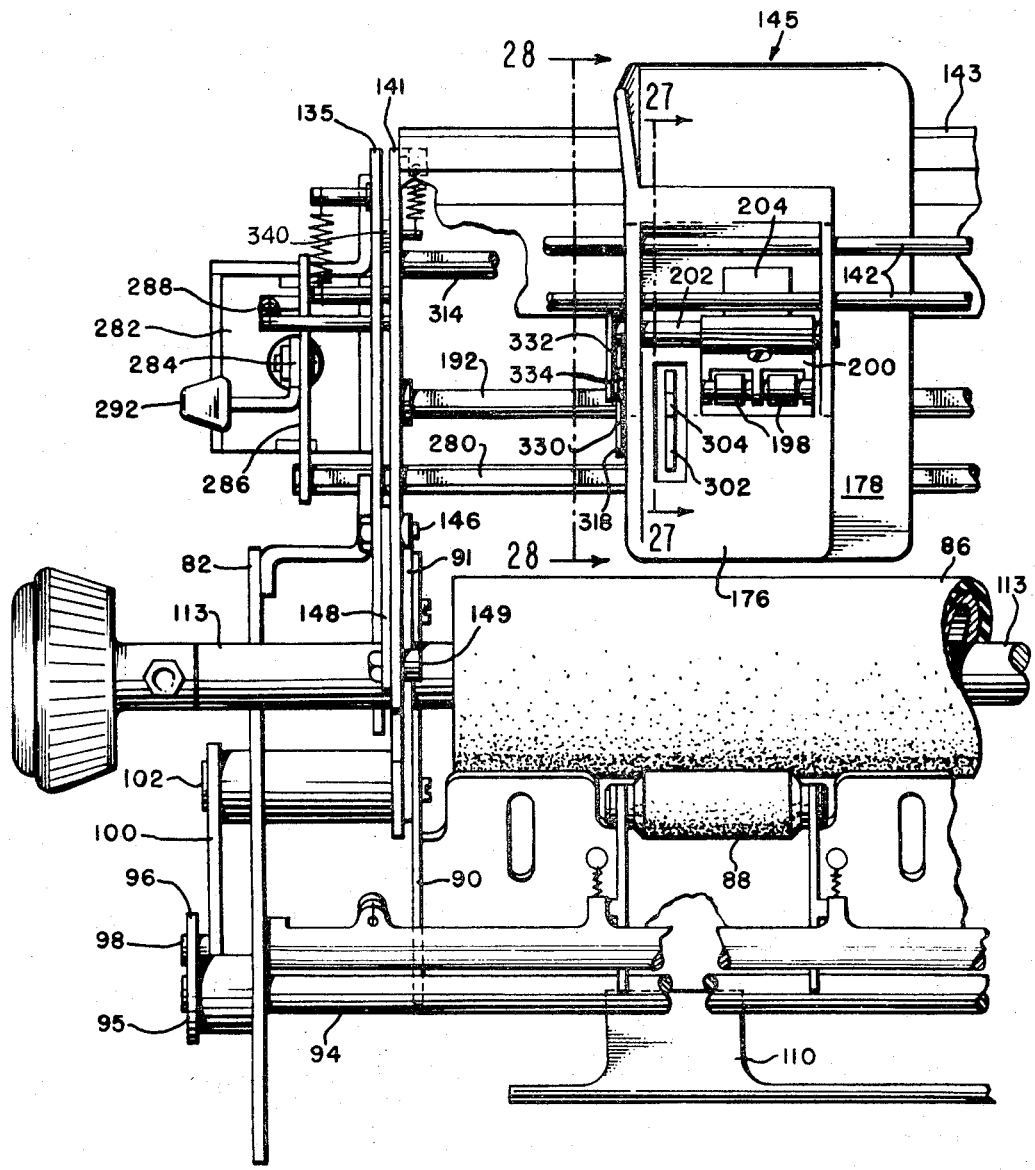
FIG. 7 is another enlarged fragmentary front view of a leftward end portion of the accounting machine.
Figure 8:
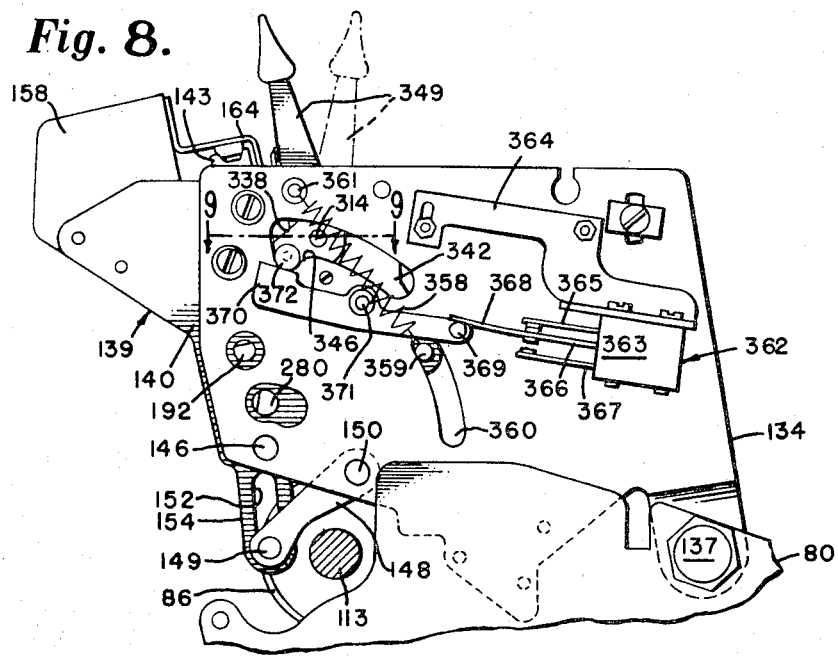
FIG. 8 is a fragmentary view of the rightward side of the machine.
Figure 9:
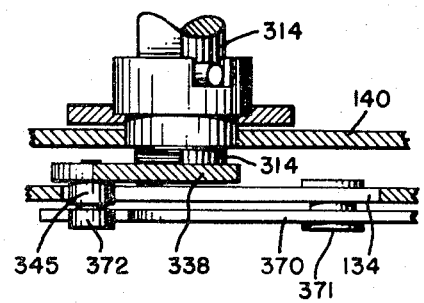
FIG. 9 is a horizontal sectional view, taken along the line 9—9 of FIG. 8.
Figure 10:
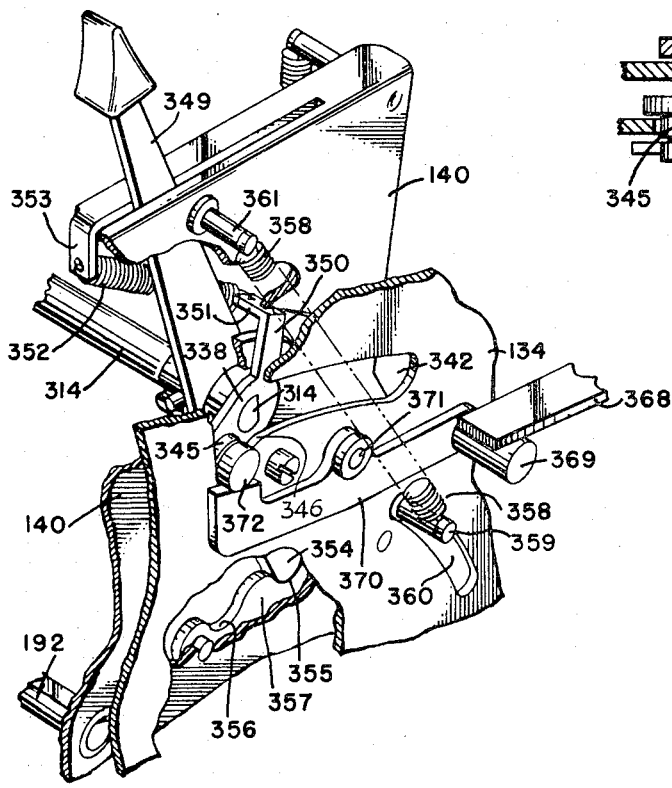
FIG. 10 is a fragmentary perspective view of the structure and mechanism of FIGS. 8 and 9.

Affixed to the shaft 314 there is a pair of lever arms 338 and 340 which are respectively located at opposite ends of the shaft and respectively adjacent the stationary frame side plates 134 and 135. In the frame side plates 134 and 135 are provided a pair of generally arcuately shaped slots 342 and 344 respectively which are alike in outline and respectively overlie opposite ends of the shaft 314, as shown, for example, in FIGS. 8, 9 and 10. The arcuate side edges, defining the slots 342 and 344, are generated from a common center which is coincident with the axis of the stub shaft 146, about which the frame side arms 138 and 140 tilt, when the platen 86 moves between open and closed positions. Adjacent their forward ends, the lower edges of the slots 342 and 344 are formed to provide cam risers 346 and 348 respectively to effect the cranking of shaft 314 by the crank arms 338 and 340, the risers extending upwardly from the home positions of cam followers 345 and 347 which are carried by the free ends of the crank arms 338 and 340. The cam followers 345 and 347 are in their home positions as shown in FIGS. 8, 9 and 10, when the frame arms 138 and 140 are in their forwardly tilted positions corresponding to open position of the platen 86. Thus, it will be seen that when the platen 86 is moved to its closed position, causing the arms 138 and 140 to tilt rearwardly about the shaft 146, the shaft 314 is carried rearwardly with the arms and as the cam followers 345 and 347 ride up the cam risers 346, 348, the crank arms 338 and 340 pivot to rotate the shaft 314. As previously mentioned, rotation of the shaft 314 rocks the bails 316 and 336 to retract the pressure rollers 197 and the brake operators 212 and 302. The shaft 314 may also be rotated to retract the pressure rollers 197 and the brake operators 212 and 302 by means of a hand lever 349 which is affixed onto the shaft, adjacent the tiltable rightward frame side plate 140, as shown in FIG. 10. To accomplish this, an upwardly extending arm 350 of the lever 338 has a laterally projecting end portion 351 for abutment by the rearward edge of the manually operable lever 349 to effect rotation of the shaft 314 when the lever 349 is pushed rearwardly. A coil spring 352 has one end thereof attached to the lever end portion 351 and the other end attached to an ear 353 on the tiltable frame side member 140, the spring tending to rotate the shaft to its normal position and the cam follower 345 downwardly to the low portion of the cam, as shown. At the leftward frame side plate, the lever 340, like the rightward lever 338 is biased by a spring 352 connecting a lateral projection 351 of lever 340 and a tab 353 of frame member 35, as shown in FIG. 7. A downwardly directed arm 354 of the manually operable lever 349 is rounded to engage in one or the other of a pair of detent notches 355 and 356 provided in the upper edge of a plate 357 which is rigidly secured to and flat against the frame side plate 140. In the position of the manually operable lever 349, shown in FIGS. 8, 9 and 10, the shaft 314 has been rotated to the position permitting the pressure rollers 197 and the brake operators 212 and 302 to assume their normal positions, shown in FIGS. 20 and 22, for example. When the manually operable lever 349 is pushed rearwardly or clockwise, facing FIG. 8, to retract the pressure rollers 197 and the brake operators 212 and 302, the lower end 354 of the manually operable arm 349 is forced out of the detent notch 355 into the other detent notch 356 in which it is yieldingly held by a coil spring 358. One end of the spring 358 is attached to a guide pin 359 which is affixed to the side plate 140 and moves in an arcuate slot 360 in the frame side plate 134 and the other end of the spring 358 is attached to a pin 361 which is secured to the tiltable frame side plate 140. Similarly, the leftward side plate 141 is biased by a spring 358, as shown in FIG. 11.

The pressure rollers 197 and 198 are released or separated from their feed rollers to release a sheet preparatory to a transfer of control of the sheet to the platen 86, the release of the sheet being effected substantially simultaneously with engagement of the sheet by the platen 86. The brake operators 212 and 302 are retracted to their aforementioned second retracted positions to avoid obstruction to further movement of the sheet and possible mutilation thereof at the sensed slit, said further movement of the sheet being effected by the closing action of the platen which pulls the sheet down a predetermined distance to position the next available unused line at the printing position.

Rotation of the lever 338, whether by the platen opening and closing operation or manually by the lever 349, operates a switch, designated generally by the numeral 362, for controlling operation of the feed motor 240, FIGS. 8 and 41. The switch 362 includes a mounting or body 363, secured to the frame side plate 134 by a bracket 364. The switch 362 includes three resilient switch members or blades 365, 366 and 367 which are secured to the switch body 363 and extend therefrom in spaced apart and generally parallel relation. As shown in FIG. 8, the medial switch blade 366 is normally in engagement with switch member 365 and is flexible downwardly to break said contact and engage the lower switch blade 367. An extension 368 of the switch blade 366 is insulated therefrom and has an end which rests on a stud 369, carried by one end of a lever 370 which is pivoted intermediate its ends, as at 371, to the frame side plate 134. Resting on the other end of the lever 370 is a roller 372 which is on the same shaft as the cam follower 345 of lever 338, and the lever has been pivoted counterclockwise to engage and hold the contact of switch blade 366 in engagement with the contact of the upper switch blade 365, as shown in FIG. 8. In making these contacts, the switch blade 366 has been flexed upwardly away from the contact of the lower blade 367 such that when lever 370 is allowed to rotate clockwise the tensioned blade 366 will flex downwardly and engage its contact with the contact of the lower switch blade 367.

Referring now to FIGS. 29 to 34, the transmission mechanism 38 comprises a housing 373 having a bottom wall 374, a top wall 375 and side walls 376 and 377. Within the housing 373, adjacent the bottom wall thereof, there is a gear train including a driving gear 378, an intermediate gear 379, an idler gear 380 and two driven gears 381 and 382. The gears 378, 379, 380, are respectively and freely mounted on vertical shafts 384, 386 and 388 which are mounted in and to the housing bottom wall 374. The gear 378 meshes with a gear 389 which is integral with gear 379. The gears 381 and 382 are rotatable on vertical shafts 390 and 392 respectively, which shafts are rotatable, the shafts 390 and 392 being journaled for rotation in the housing bottom and top walls 374 and 375. The gear train is driven by the motor 62, FIG. 29, from a power take-off shaft 394 which is geared to the cam shaft 60, the shaft 394 having a bevel gear 396 affixed thereto and in mesh with a gear 397 which is affixed to the gear 378 of the gear train, as shown in FIG. 31. The driven gear 381 is a part of the mechanism shown in FIG. 32 for opening and closing the carriage platen 86, and the driven gear 382 is a part of the mechanism shown in FIG. 33 for rotating the platen 86 to effect vertical line spacing of a record sheet.

Referring first to the mechanism of FIG. 32, the gear 381 is secured to the lower end of a hub of a clutch member 398 which is therefore the driving clutch member, and the clutch, designated generally by the numeral 397, includes an upper driven clutch member 399 which is affixed onto the rotatable shaft 390. The driven clutch member 399, through the upper end of shaft 390, is operatively connected to the previously described bail 110 by a shifter member or slide 400 which is slidably movable transversely of the bail, as shown in FIG. 32. The slide member 400 is slidably guided by guide members 401 which are securely mounted on the top wall 375 of the transmission housing, and carried by the slide member 400 in spaced apart relationship longitudinally thereof is a pair of abutment members or rollers 402 between which the bail 110 extends for operation by the slide. The driven clutch member shaft 399 may be connected to the slide member 400 by a pair of arms 403 and 404 pivoted together, as at 405. A clutch controlling arm 406 projects laterally from the clutch and is normally held in clutch disengaged position by one or the other of a pair of abutment members 407 on a clutch controlling slide 408 which is shiftable rightwardly in FIG. 32 to release the clutch arm 406 with resultant engagement of the clutch. Upstanding posts 409 are secured in the top wall 375 of the transmission housing and are received in slots in the clutch control slide member 408 to guide the latter.

Figure 36:
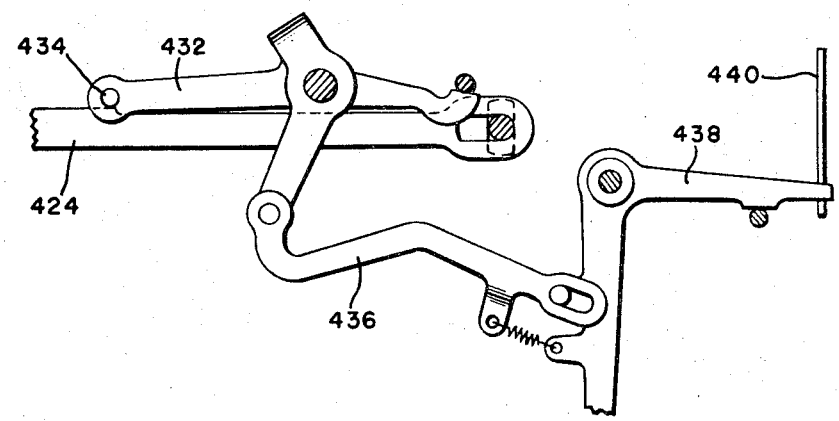
FIG. 36 is a vertical sectional view, partly in elevation and taken along the line 36—36 of FIG. 29.

The clutch control slide member 408 has a laterally directed extension arm 410 with an upturned end portion in which a stud 412 is secured and received by a forked end of an arm 414 of a shifter lever 415 which is rotatable on a stud 416 fixed in side wall 377. It will be seen by reference to FIG. 32 that rotation of the lever arm 414 in a clockwise direction will move the slide member 408 to the right whereby to release the clutch control arm 406. The lever arm 414 has a lateral extension or bail 418 which has an upwardly offset end portion 420 that positions adjacent to and rearwardly of a pawl 422, FIG. 34. A slide member 424 is mounted to slide transversely to the axis of the camshaft 60 and carries the pawl 422 laterally thereof, the forward end of the slide member 424 being just rearwardly of a stud 426 carried by the lower free end of a pivotal striker arm 428. The arm 428 is pivotally mounted near its upper end on a shaft 429, FIG. 15, and is pivotal toward the adjacent end of the slide member 424 when the lever is struck by a pin 430 which is secured to and projects from one side of a gear 431, the gear being affixed onto the camshaft 60. Normally, the free end of the slide member 424 is in a raised position to which it is biased and in which position it is out of striking range of the stud 426 for those cycling operations of the machine following which opening of the platen 86 is not desired. In order to pivot slide 424 to position its free end to be struck by the stud 426, a lever 432 is provided above the slide 424 and carries a stud 434 which engages the upper edge of the slide, as shown in FIGS. 34 and 36, such that the free end of the slide may be depressed by rotating lever 432 counterclockwise. The lever 432 is connected by a link 436 to a second lever 438 at the rear of the carriage, and carried by the lever 438 is an extension member 440 positioned to sense one of the pins 130 in the last columnar position of the carriage. When this occurs, the free end of slide 424 will be struck by the stud 430 and shifted rearwardly which will rotate the shaft 416 and move the clutch control slide 408 forwardly whereupon the clutch will become engaged to effect retraction of the platen 86 to open throat position.

As shown in FIG. 34, a bail type lever 442 is pivotally mounted adjacent the lever 14 on a shaft 444 and the levers have arms 418, 419 pivotally connected together by a pin 446 and slot connection such that pivotal movement of either of the arms in one direction causes the other arm to pivot in the opposite direction. Carried by the lever 442 there is a link 448 having a free end 450, which positions rearwardly of the path of travel of a stud 452 which is secured to and projects laterally from the lower free end of a striker arm 454. A stud 456, secured in and to the gear 431, strikes and pivots the arm 454 each cycling of the cam shaft 60 and if the platen 86 is in open position, the link 448 will be driven rearwardly which will rotate shaft 416 and through lever 414 will move the clutch controlling slide member 408 to effect clutch engagement. The stud 456 is positioned such that it will strike arm 454 near the start of the camshaft cycle so as to effect the carriage closing operation prior to the operation of the print hammers 48.

*Automatic opening of the carriage*

In FIG. 32, the parts of the mechanism are in the positions they assume when the carriage platen 86 is in closed or printing position. Assume that the operation of the machine is programmed for posting operations. This means that in the columnar positions of the carriage there would be a pin 130, FIGS. 1 and 15, in only the last columnar position. Accordingly, with the exception of the last columnar position, the slide 424, FIG. 34, will remain in its ineffective position, or position in which it will not be engaged by the stud 426 of striker arm 428, consequently preventing operation of the carriage open and close clutch. However, when the carriage tabulates to the last columnar position, a pin 130, in the control program device 128, causes stud 434 to depress the forward end of slide 424 in position to be struck by stud 426 which, on cycling of the machine moves the slide 424 rearwardly. The laterally positioned pawl 422, carried by the slide 424 engages and pivots the bail 420 which is connected to rotate the shaft 416, FIG. 32, to move the clutch controlling slide 408 forwardly whereby to effect movement of the carriage platen 86 to open throat position. Also, the bail 420 pivots bail 442, to move link 448 forwardly in the path of movement of the stud 452 of arm 454.

*Automatic closing of the carriage*

As described above, each time the clutch control slide 408 is moved rearwardly to cause the platen to be opened, the lever 442 is rocked counterclockwise and moves link 448 forwardly in the path of movement of the stud 452 of the striker arm 454. The arm 454 is engaged and pivoted counterclockwise by the stud 456 which is carried by the gear 431 which is affixed to the camshaft 60, the stud 456 being positioned such that at the beginning of each cycle of operation of the camshaft, the stud 452 will push the link 448 to its rearward position and rock the bell crank 442 clockwise and the bell crank 420 and member 414 counterclockwise to move the clutch control slide 408 forwardly to cause the platen 86 to move to closed or printing position. Preferably, the timing of the platen closing operation is such that it occurs before the printing hammers are operated in the cycle of machine operations.

A forwardly extending arm 460 of the lever 414 carries a stud 462 which is engaged by the double V-notched edge of a detent arm 464, pivoted at its upper end on a pin 466 which is secured in and to the housing side wall 377, FIG. 32. A spring 468 urges the detent arm 464 counterclockwise against the detent pin 462. The free or forward end of the lever arm 460 abuts a stud 470 which is secured to and projects laterally of one arm of a lever 472. The lever 472 is secured onto a shaft 474 which is journaled for rotation in the opposite side walls 376 and 377 of the transmission housing 373. A coil spring 476, connected to an arm of lever 472, urges the lever and shaft 474 to rotate in a counterclockwise direction. A slide member 478 is mounted on the underside of the housing top wall 375 in which depending pins 480 are fixed and received in guide slots 482 provided in the slide member near the opposite ends thereof. Secured to and depending from the slide member 478 there is an abutment pin 483 in engagement with an arm 484 of a lever 486 which is pivoted, as at 487, on the underside of the housing top wall 375. Carried by another arm of the lever 486 there is a roller type detent member 488 which is adapted to engage in one or the other of a pair of diametrically positioned V-notches in the periphery of a disc 490 which is secured to the upper end of the clutch member 399 for rotation therewith. The pair of V-notches are, of course, indicative of the well known one-half revolution clutch.

Figure 35:
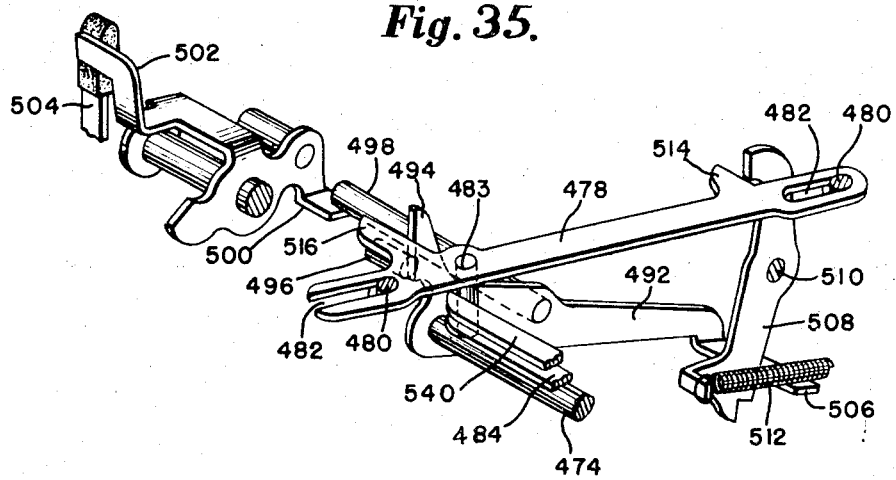
FIG. 35 is another perspective view of parts of the transmission mechanism.

A lever 492 is affixed to the rotatable shaft 474 adjacent the slide member 478 and has an upwardly directed arm 494 to engage a stop pin 496, FIG. 35, which is secured in and to the housing side wall 376. The lever 492 is normally yieldingly held against the pin 496 by the coil spring 476, FIG. 32, connected to lever 472. The lever 492 carries a stud 498 to engage a lug 500 of a lever 502 which in turn engages and operates a switch operating arm 504, FIG. 35, to releasably hold a switch member 64 closed, FIG. 41. As shown and described in detail in the Butler patent, the arm 504 is provided to keep the machine cycling motor 62 operating after the normal 360° cycling operation of the cam shaft 60 so as to employ said motor for the opening operation of the platen 86 and/or for line spacing operation of the platen, as may be required by the machine program.

On the lower rear end of the lever 492 there is a lug 506 which extends through an opening in the housing side wall 376 and cooperates with the lower shouldered end of a latch lever 508. The latch lever 508, FIG. 32, is pivoted, as at 510, to the housing side wall 376 and is biased counterclockwise, as viewed in FIG. 35, by a spring 512. When the lever 492 is moved to engage the switch operating arm 504 to hold the motor switch closed, the lug 506 is lowered below the shoulder on the latch lever 508 which is thereupon rocked counterclockwise by the spring 512 to latch the lever 492 in switch closed position. The slide member 478 has two laterally directed extensions 514 and 516 extending respectively in the path of the upper arm of the latch lever 508 and the upwardly directed projection 494 of the lever 492. When the slide 478 is moved rearwardly, the projection 514 engages the latch lever 508 and moves it away from the lug 506 before the projection 516 rocks the lever 492 far enough to lower the lug 506 below the latching shoulder on the lever 508.

From the above, it will now be understood that each time the clutch 397, FIG. 32, is activated by the shifting of its control slide 408, the platen operating slide 400 will be actuated and through bail 110 will move the platen 86 to its open position. At the same time, the arm 460, acting against the stud 470 and lever 472 will rotate the shaft 474 and levers 492 and 502 counterclockwise, FIGS. 32 and 35, to engage and hold the switch 64, FIG. 41, in closed position and the latch lever 508 in latched position. Soon after the extension 494 of lever 492 is moved away from the cooperating extension 516 of the slide member 478, the upper driven clutch member, FIG. 32, begins to rotate which forces the detent 488 out of the disc notch and pivots lever 486 which, acting against the slide pin 483, moves the slide member 478 rearwardly. This releases the latch lever 508 and transfers the motor switch holding function to the lever 486.

The transmission 38 includes mechanism for operating the bail 126, FIG. 33, to effect line spacing of the platen 86 and the mechansim comprises a one revolution clutch 520 having a lower driving component 522 and an upper driven component 524. The driving component 522 of the clutch has a hub which is integral with the gear 382 and receives the vertical shaft 392 which is journaled for rotation in the housing bottom wall 374 and extends upwardly through the upper clutch component 524 and the top wall 375 of the transmission housing. Secured to the upper end of the shaft 392 there is an arm 528 in which an abutment pin or stud 530 is secured in position to engage and operate the line spacing bail 126.

Within the transmission housing 38 a disc 532 surrounds the shaft 392 and is rigidly secured onto the upper end of the clutch component 524, the disc having a V-notch in its edge to receive a detent 534, carried by an arm 536 of a bell crank 538. The bell crank 538 is pivotally mounted on the vertical shaft 487 and has an arm 540 which, near its free end, is in abutting relation with the pin 483 of the slide member 587. A spring 542 is provided for yieldingly holding the detent 534 in the V-notch of the disc 532. A clutch control arm 544 projects laterally from the clutch 520 and is releasable to effect clutch engagement, but is normally held ineffective by a lug 546 on an arm 548 which is secured to a rotatable shaft 550. The shaft 550 extends parallel to the shaft 474 and is journaled for rotation in the opposite side walls 376 and 377 of the transmission housing. Affixed to the shaft 550 there is an arm 552 provided with a laterally disposed lug 554 in engagement with a stud 556 carried by and secured to the arm 472. A spring 558 is provided to return arm 552 to the position shown in FIG. 33. Another arm 560 is secured to the shaft 550 outwardly of housing side wall 377 and carries a laterally extending pin 562 for abutment by an upwardly directed extension 564 of a slide member 566, FIGS. 15 and 33. When the slide member 566 is moved to the right, the extension 564 acting against pin 562 will rotate the shaft 550 clockwise whereby lug 554 acting against the stud 556 will pivot the shaft 474 clockwise. The pivoting of the shaft 550 clockwise will move lug 546 away from the clutch control arm 544 and the clutch will engage and drive the shaft 392 through one revolution when lug 546 will again be in position to stop and hold the arm 544 in declutched position. During the one revolution of the shaft 392, the stud 530 revolves against the bail 126 to effect line spacing by the platen 86, the shaft 474 is rotated clockwise to retract arm 492 and position lever 508 in latched position, and stud 534 rides out of its V-notch to pivot bell crank 538 to move the slide 478 rightwardly.

Affixed onto the camshaft 60, FIG. 15, there is an arm 570 carrying a striker pin 572 to engage and pivot a striker arm 574 which is pivoted on and depends from the shaft 429. The arm 574 carries a striker pin 576 which is provided to strike the adjacent end of the slide 566 and move it rightwardly to effect the line spacing operation of platen 86. As illustrated, the end of the slide 566, adjacent the striker pin 576, is normally above the striker pin 576, for those cycling operations of the camshaft 60, that do not require line spacing, for example, during a posting operation. The lever 578 is affixed to a rotatable shaft 580 and has a free end which carries a stud 582 in engagement with the upper edge of the slide 566 to depress the foward end thereof into the path of the striker pin 576. Also affixed to the shaft 580 is a lever 584 having a lower end which carries a stud in abutment with an upwardly directed extension 586 of a link 588. One end of the link 588 has a slot and pin connection 590 to an arm of a bellcrank 592, the other arm of which carries a pin 594 to sense a program pin 130, calling for a line spacing operation. The other end of the link 588 is supported by a pivotal arm 596 connected thereto by a pin and slot connection 598. A spring 600 yieldingly connects the lever 584 to the link 588.

Figure 37:
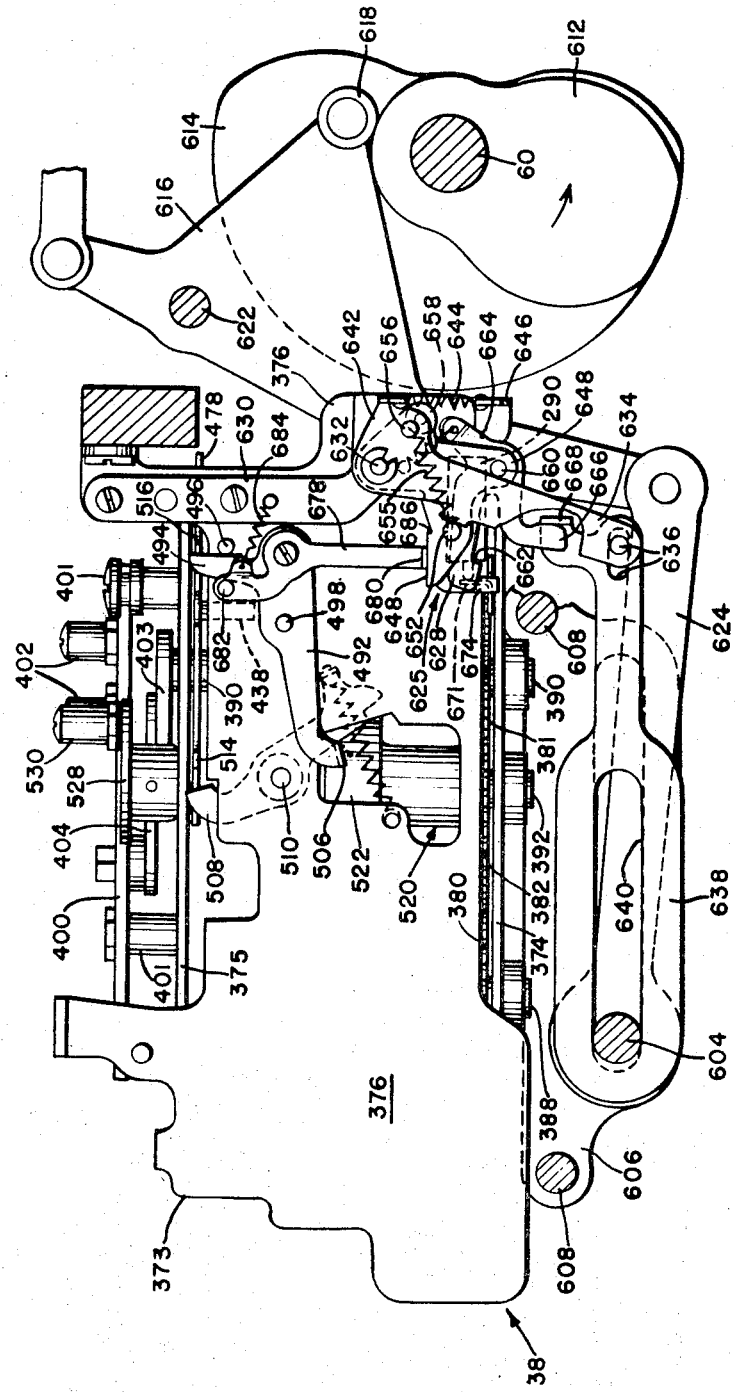
FIG. 37 is a leftward side view of the transmission and associated mechanism.
Figure 38:
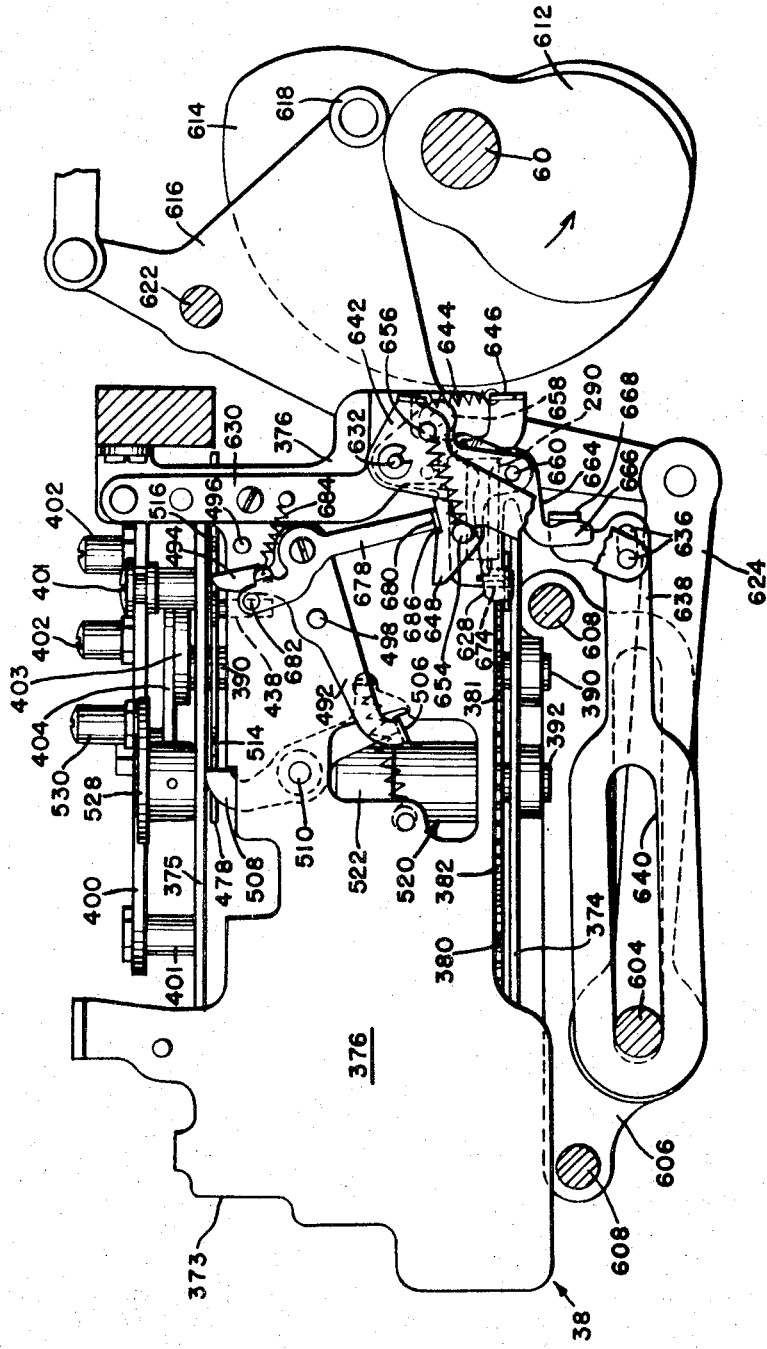
FIG. 38 is another leftward side view of the transmission and associated mechanism.
Figure 39:
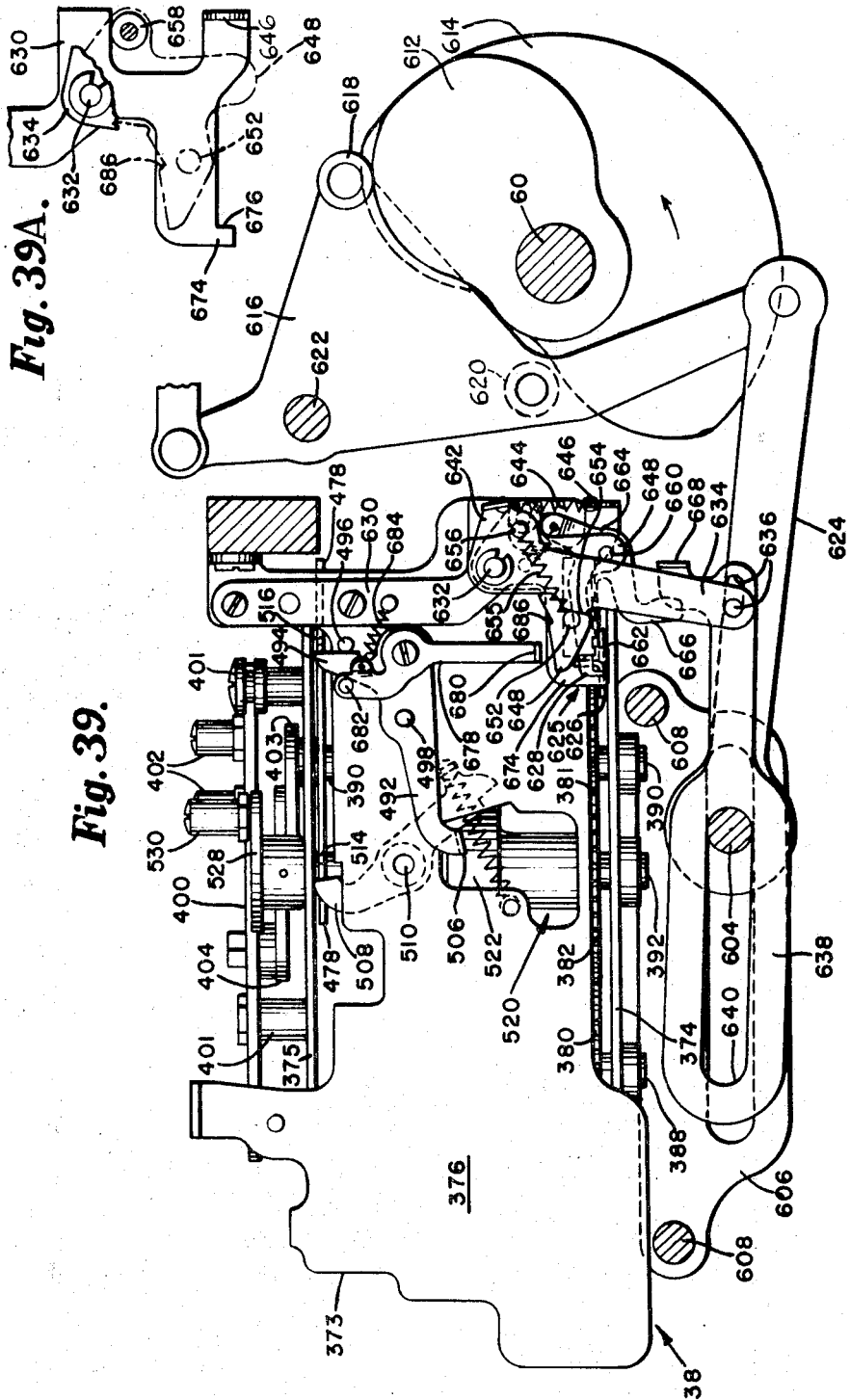
FIG. 39 is another leftward side view of the transmission and associated mechanism.

In FIG. 1, it will be seen that the amount racks 54, of which only one is shown, extend rearwardly below the transmission 38 and have upwardly directed extensions 602 abutting a cross bail rod 604, see also FIGS. 37 to 39. The bail rod 604 is movable between a rear home position and a forward position in horizontal slots provided in stationary guide plates 606 which are secured to cross rods 608. The amount racks 54 are individually biased forwardly to key selected positions by springs 610 when the bail rod 604 is moved forwardly and are returned to home position when the bail rod is moved rearwardly. As shown more clearly in FIG. 39, the bail rod 604 is operated from the camshaft 60 by cams 612 and 614 and a cam follower 616 carrying a pair of cam rollers 618 and 620, the cam follower being pivoted on a shaft 622 which is connected to the bail rod 604 by a link 624.

A coupling 625 is provided, including a switch operating arm 626 and a driven coupling member or arm 628, for operatively connecting the switch 290 to the cams 612, 614, the coupling 625 being controlled by the lever 492 and therefore responsive to either a platen opening operation or a platen line spacing operation. The coupling 625 and associated mechanism is mounted on the transmission housing side wall 376 by a bracket 630 in which is secured one end of a stub shaft 632 on which the upper end of a lever 634 is pivotally mounted. The lower end of the lever 634 is connected by a pin and slot connection 636 to one end of a link 638 which is provided with a second slot 640, extending longitudinally thereof and wherein the bail rod 604 is received. Normally, the operating parts are in the positions shown, for example, in FIG. 37 with the leftward end of the slot 640 against the bail rod 604 so that movement of the link 638 rightwardly to pivot lever 634 would not occur until after the bail rod engages the rightward end of the slot 640. The lever 634 has an arm 642 to which one end of a helical coil spring 644 is connected, the other end of the spring being anchored to an ear 646 of the bracket 630 such that the spring urges the lever 634 in a clockwise direction, as viewed in FIGS. 37 to 40. Also pivotally mounted on the shaft 632 there is a lever 648 which is positioned between the lever 634 and the bracket 630 and is spaced from the latter by a tubular spacer member 650. A lower end portion of the lever 648 projects forwardly and carries a laterally projecting stud 652 which engages in a socket 654 provided in the rearward edge of the lever 634. A spring 655 has one end secured to the stud 652 and the other end secured to a similar stud 656 which is secured to lever 634, the spring being arranged such that it yieldably holds stud 652 in the socket 654 of lever 634 and normally holds the parts for pivotal movement together. The spring 654 connects the two levers 634 and 648 for limited counterclockwise rotation as viewed in FIGS. 37 to 40 whereupon lever 648 is arrested by a stop member 658, allowing the lever 634 to pivot away from lever 648 as the cams 612, 614 complete their stroke.

The latch member 628 is pivotally mounted on a depending arm of lever 648 by a pivot pin 660 and, extending rearwardly therefrom above the switch operating arm 626, has a downturned end 662 to engage behind the arm 626. Another arm 664, integral with and extending below the latch arm 628, has a downwardly directed end portion or hook 666 engaging behind an ear 668 on the slide member 638 to disengage the latch member from the switch operating arm 626 on leftward restoring movement of the connecting link 624. The switch operating arm 626 is pivotally mounted, as at 670, and intermediate its ends has an upturned ear 671 to engage and depress a switch plunger 672 to close the switch. As the present switch operating arm 626 is not spring biased toward the plunger 672, a rearwardly extending lower end portion 674 of the bracket 630 is provided with a stop member 676 to prevent the free end of the switch operating arm from moving beyond the coupling range of the coupling member 628. A spring 677 urges the latch lever 628 counterclockwise, the spring having one end thereof attached to latch lever 628 and the other end anchored by a stud to the mounting bracket 630. Normally the action of spring 677 to pivot the latch lever 628 counterclockwise is restrained by the engagement of lever 666 with the slide tab 668.

As previously mentioned, the coupling member 628 is coupled to the switch operating arm 626 on a machine cycle of operation during which there is either a platen opening operation or a platen line spacing operation called for by the program device 128 and to accomplish this a restraining member or lever 678 is provided. The lever 678 is mounted for free rotation on the shaft 474 and, extending downwardly therefrom, has a laterally projecting lug 680 which normally engages the upper edge of lever 648 rearwardly of the lever fulcrum so as to restrain clockwise rotation of the lever against the action of the spring 644. An upwardly directed offset arm of the lever 678 carries a stud 682 which is held in abutting relation to the rear edge of the lever extension 494 by a coil spring 684 which has one end attached to the arm and the other end anchored to the mounting bracket 630.

*Operation of coupling mechanism*

When either the lever 484 of the platen opening mechanism or the lever 540 of the line spacing mechanism is operated, the slide member 478, common thereto, will be moved rearwardly, or to the left, as viewed in FIGS. 37 to 40, and through lever extension 494 and stud 682 will pivot the coupling restraining lever 678 counterclockwise. This moves the lever lug 680 off of the upper edge of the lever arm 648, releasing the latter such that spring 644 now becomes effective to pivot the lever 634 clockwise. As the lever 634 pivots clockwise, the lever 648 carried thereby is moved rearwardly and upwardly in back of the lug 680 to effect latching between the lug and an abutment 686 on lever arm 648. At the same time that lever 634 is pivoted clockwise by the spring 644, the coupling member 628 has been pivoted counterclockwise by the spring 677 and as the coupling member 628 moves rearwardly with lever 648, the downwardly directed hooked end 662 thereof engages rearwardly of and couples with the switch operating arm 626. On the next cycle of operation of the machine, the slide 638 will be moved rightwardly which pivots lever 634 and, through spring 655, lever 648 is carried downwardly, thus pivoting the switch operating arm 626 in a direction to close the switch 290 and activate the perforator 270. After a predetermined movement of lever 628, sufficient to close the contacts of switch 290 and allow the restraining lever 678 to swing back over the forward end of lever 648, the latter is stopped, but lever 634 moves away from lever 648 for the full rearward travel of the slide member 638. Upon return movement of the slide member 638, the lever 634 and levers 648 and 628 are restored to the positions shown in FIG. 37 with the restraining lever 678 in normal restraining position. If on the next cycle of operation of the machine, neither a carriage opening or line spacing operation is called for by the program device, the slide member 478 will not be operated and therefore the coupling members 626 and 628 will not be coupled so that when the slide member 638 is moved rearwardly, the hooked end of latch member 628 will clear the switch operating arm 626 to avoid operation of the perforator switch 290. This condition occurs on posting operations following the operation of the perforator in the first carriage position so as to avoid unnecessary repetitious operation of the perforator in the remaining carriage positions of a posting line of print.

With reference particularly to the diagrammatic circuit illustration of FIG. 41, the numerals 687 and 688 designate the main leads from an electrical power source and across these leads is connected the accounting machine motor 62 by motor leads 690 and 692 in the latter of which is the motor switch 64. For operatively connecting the motor 62 to the machine camshaft 60 is the well known one revolution clutch which is here represented diagrammatically as comprising the biased clutch operating member 68 and the releasable pawl 70 cooperable therewith. The numeral 66 designates the well known motor bar and the bar is represented as being mechanically connected, as at 702, to the motor switch 64 and to the pawl 70. The retractable stop member, or block 72, is normally in position to prevent operation of the pawl 70 and the motor switch 64 by the motor bar 66 and is represented as the movable core of the solenoid 74. A normally open switch 708 controls the solenoid 72 and is mechanically connected to and operated by the motor bar 66. The switch member 708 is connected by a lead 710 to the main lead 687 and the fixed contact of the switch member is connected by a lead 712 to one end of the solenoid coil 74 which has its other end connected by a lead 714 to the differential switch contact 267. The sheet feed motor 240 is connected across the main leads 687 and 688, the motor having one terminal thereof connected by a lead 716 to the differential switch contact 268 and another lead 718 connected to the differential switch contact 263. In the main lead 688 is the aforementioned switch 366 which is movable between its fixed contacts 365 and 367 with the platen opening and closing actions respectively. The switch contact 367 is connected by a lead 720 to a relay 722 which is connected to a fixed contact 724 of relay 722, normally engaged by a movable contact 726 of the relay 722, the contact 726 being connected to the main lead 687. A second fixed contact 728 of the relay 722 is connected to a well known latching relay 730 which in turn is connected by a lead 732 to the differential switch contact 265. When the relay 722 is energized, its movable contact 726 will be latched mechanically by the latching relay 730 to hold the contacts 726 and 728 engaged following de-energization of relay 722, the latching solenoid being energized only to release the clapper and switch 726, as is well known in the art. In addition to contacts 724, 726 and 728, the relay 722 has a set of normally closed contacts 734 and 736 in lead 714 and a set of normally open contacts 738 and 740 in lead 718. The normally closed sheet detector switch 699 has its fixed contact 758 connected by a lead 759 to the lead 714 and its movable contact 764 connected to the main lead 688 between the switch 366 and the differential switch 259. Connected across the main leads 687 and 688 are the contacts of the perforator switch 290, the perforator operating solenoid 282 and a normally open switch member 744. The switch members 290 and 744 mutually control the perforator operating solenoid 282, the switch 744 being operated subsequently to the operation of the switch 290 by a timing cam 746 on the camshaft 60. The cam 746 is preferably arranged to close the switch 744 at about the same time that the print hammers operate.

In FIG. 41, the various switches and other operating devices of the system are in the positions they will assume when the carriage platen 86 is in its open position, the sheet feed motor circuit being closed and the motor 240 operating. When a record sheet is inserted into the guideway 162, the sheet opens the detector switch 699 to prevent operation of the machine motor 62 during the sheet feeding operation. The sheet proceeds to the platen 86 and is stopped by the line find apparatus brake. The brake stops the motor driven shaft 244, and the continued operation of the driving shaft causes the nut 254 to move leftwardly along the shaft. In its leftward movement, the nut 254 moves the switch contacts 257 and 259 away from the normally engaged fixed contacts 268 and 265 and into engagement with the contacts 263 and 267. Movement of the contact 257 away from the fixed contact 268 breaks the circuit and stops operation of the sheet feed motor 240. Engagement of the contact 267 by the movable contact 259 conditions the circuit of the motor block solenoid 74, the circuit being from main lead 687, lead 710, switch 708, lead 712, solenoid 74, lead 714, contacts 734 and 736, and switch contacts 267 and 259 to the other main lead 688. The carriage platen 86 is now closed which causes the switch contact 366 to be moved from the fixed contact 365 into engagement with the fixed contact 367 whereby the circuit of the relay 722 is closed which moves contact 726 into engagement with contact 728 and allows the relay contact 726 to be latched mechanically by the clapper of the latching relay 730 as the relay 722 is de-energized by the opening of contacts 724 and 726. Also, the relay contact 738 is latched closed and contact 734 is latched in open position. That is, when the switch 366 is moved to its dot and dash position, as the platen 86 moves to closed position, the relay 722 is energized and moves the switch contact 726 into engagement with contact 728, closes contact 738 and opens contact 734 and the contacts are latched in these positions by the latching relay 730. Thus, engagement of the switch 366 with its contact 367 conditions the following motor reversing circuit for the sheet feed motor 240: From the main lead 687, through the reverse operation coil of motor 240, lead 718, the now latched closed contacts 740 and 738, differential switch contact 263, differential switch 257, main lead 688, and switch contact 366 when the latter again engages contact 365. In addition to conditioning the reverse circuit of the sheet feed motor 240, the closing of the switch 366 with contact 367 conditioned the circuit of the motor block solenoid 74 for operation upon depression of the motor bar 66, the circuit being as follows: From the main lead 687, lead 710, motor block switch 708, lead 712, solenoid 74, leads 714, 720, and the now closed contacts 367 and 366 to the other main lead 688. The machine operator may now depress the motor bar 66 to activate the machine for a cycle of accounting operations followed by the printing of the results on the record sheet. If the processing of the record sheet is complete, the program device 128 will call for a carriage opening operation preparatory to ejecting the record sheet from the platen 86 by reverse operation of the sheet feed motor 240. When this occurs, the carriage opening action causes the switch contact 366 to return to engagement with the fixed contact 365 which renders the motor block 72 effective and also conditions the circuit of the latching relay 730 such that the circuit will be completed upon the return of the differential contact 259 to its normal full line position, engaging contact 265. In addition, the closing of contact 366 with fixed contact 365 places the feed motor reverse circuit across the main leads 686 and 688 so that the motor 240 starts and ejects the processed sheet from the platen 86. The ejected sheet releases the detector switch 699 and the brake of the leftward side guide member 145 which brake stops the feed motor driven shaft 244 whereupon the nut 254 is caused to move rightwardly to return contacts 257 and 250 respectively to their fixed contacts 268 and 265. This restarts the feed motor 240 in the sheet feed direction, and at the same time closes the circuit of and pulses the latching relay 730. The latching relay 730 then releases the relay switch 726 and the switches 734 and 738 and the switches resume their normal positions shown.

When the carriage platen 86 is opened for ejection of the processed record sheet mentioned above, the coupling members 626 and 628 were engaged, as previously described, by such action so that on the next cycling operation of the machine, the perforator 270 is actuated to perforate the sheet as a line designation for a subsequent line sensing operation. The timing cam 746 on the cam shaft 60 operates to close the switch 744 and activate the perforator solenoid 282 at the same time that the print hammers operate. The above also occurs when the program device 128 calls for a vertical line spacing operation of the platen 86.

The detector switch 699, FIG. 27, is mounted on the mounting 182 between the mounting side members 184 and rearwardly of the brake operator 302. The switch 699 includes a supporting member or body 750 having an upper end adjacent which the body is pivoted, as at 752, to the mounting side members 184 and a lower end provided with an extension which carries a cam follower roller 754 in engagement with a cam 756 on the peripheral edge of the brake operator 302. An opening in the body 750 extends through the upper and lower ends thereof to receive an elongated resilient contact member 758 which has its upper end connected to a plate-like terminal 760, overlying and secured to the upper end of the body. Projecting below the lower end of the body 750, the resilient contact member 758 abuts against an insulated abutment member 762 which is affixed to the mounting 182, the contact member being tensioned to hold the cam follower 754 in engagement with the cam 756. Adjacent its lower end, the body 750 is slotted transversely thereof to slidably receive a movable switch contact member 764 which is bifurcated to straddle the resilient contact member within the body. In the normal positions shown, the switch contact members 758 and 764 are in engagement with the inner end of the slidable contact member 764 against the inner surface of the body wall opposite the slotted well in which the contact member is supported. Consequently, when the body 750 is pivoted clockwise by the cam 756, the contact member 764 will be moved out of engagement with contact member 758 thereby opening the circuit of the machine block solenoid 74 as previously described above in connection with the circuit illustration of FIG. 41.

What is claimed is:

1. In a printing apparatus, supporting means, a platen mounted on said supporting means to pivot between an open record receiving position and a closed sheet holding position, means operable to pivot said platen between said positions, a pair of oppositely disposed connected together arms pivotally mounted on said supporting means, a pair of sheet guide members carried by said arms, first cam means operatively connecting said arms to said platen pivot operable means to effect a pivoting of said arms in an opposite direction to the pivoting of said platen, sheet feed means mounted on said guide members including a driven feed roller and a pressure roller,.

said pressure roller being retractable from said feed roller to release a sheet, a rotatable shaft mounted on said guide members and extending axially between said arms, said shaft being operatively connected to said pressure roller to retract the latter upon rotation of said shaft in a predetermined direction, a pair of cranks affixed onto said shaft respectively adjacent said arms, second cam means on said supporting means, and cam followers carried by said cranks and riding on said second cam means to rotate said shaft by and upon pivoting of said arms.

2. In a printing apparatus as defined by claim 1 which includes a control member operatively connected to control said sheet feed means, and a control member actuator carried by each of said cam followers.

References Cited
UNITED STATES PATENTS

| | | |
|---|---|---|
| 3,107,772 | 10/1963 | Templeton _____ 197—127 |
| 3,211,270 | 10/1965 | Templeton _____ 197—127 |
| 3,211,271 | 10/1965 | Holladay _____ 197—127 |
| 3,211,272 | 10/1965 | Holladay et al. _____ 197—127 |
| 3,247,944 | 4/1966 | Templeton _____ 197—127 |
| 3,247,945 | 4/1966 | Holladay _____ 197—127 |

EUGENE R. CAPOZIO, *Primary Examiner.*

ROBERT E. PULFREY, *Examiner.*

E. T. WRIGHT, *Assistant Examiner.*